(12) United States Patent
Kojima et al.

(10) Patent No.: US 10,336,299 B2
(45) Date of Patent: Jul. 2, 2019

(54) BRUSHLESS WIPER MOTOR

(71) Applicant: Mitsuba Corporation, Gunma (JP)

(72) Inventors: Naoki Kojima, Gunma (JP); Masaaki Kimura, Gunma (JP); Yukiyoshi Iso, Gunma (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 109 days.

(21) Appl. No.: 15/525,304

(22) PCT Filed: Nov. 4, 2015

(86) PCT No.: PCT/JP2015/080997
§ 371 (c)(1),
(2) Date: May 9, 2017

(87) PCT Pub. No.: WO2016/076166
PCT Pub. Date: May 19, 2016

(65) Prior Publication Data
US 2017/0313283 A1     Nov. 2, 2017

(30) Foreign Application Priority Data

Nov. 11, 2014   (JP) ................................ 2014-229259

(51) Int. Cl.
*H02K 1/06*     (2006.01)
*B60S 1/08*     (2006.01)
(Continued)

(52) U.S. Cl.
CPC ................ *B60S 1/08* (2013.01); *H02K 1/146* (2013.01); *H02K 1/185* (2013.01)

(58) Field of Classification Search
CPC ............................... H02K 1/146; H02K 1/185
(Continued)

(56) References Cited

U.S. PATENT DOCUMENTS

| 3,465,188 A * | 9/1969 | Sisk | H02K 1/16 29/596 |
| 6,020,667 A * | 2/2000 | Carey | H02K 1/185 29/596 |

(Continued)

FOREIGN PATENT DOCUMENTS

| CN | 102142756 A | 8/2011 |
| CN | 103348565 A | 10/2013 |

(Continued)

OTHER PUBLICATIONS

Machine Translation for WO 2013/121754; Oct. 21, 2018.*
(Continued)

*Primary Examiner* — Hanh N Nguyen
(74) *Attorney, Agent, or Firm* — McCormick, Paulding & Huber LLP

(57) ABSTRACT

In a brushless wiper motor, first and second pressing claws (43a and 43b) are formed on an outer periphery (OP) of steel sheets (34a) forming a stator core (34), and press-fitted to an inner periphery (IP) of the motor housing unit (31) so that the stator core (34) is fixed to the motor housing unit (31), base end portions of the first and second pressing claws (43a and 43b) are respectively connected to first and second walls formed on the outer periphery (OP) of the steel sheets (34a), and tip end portions of the first and second pressing claws (43a and 43b) each serves as a free end, and are directed in a circumferential direction of the stator core (34).

11 Claims, 15 Drawing Sheets

(51) Int. Cl.
*H02K 1/14* (2006.01)
*H02K 1/18* (2006.01)

(58) Field of Classification Search
USPC .......................................... 310/216.049, 90
See application file for complete search history.

(56) References Cited

U.S. PATENT DOCUMENTS

| | | | | |
|---|---|---|---|---|
| 7,538,468 | B2* | 5/2009 | Kobayashi | H02K 1/185 |
| | | | | 310/216.049 |
| 7,719,157 | B2* | 5/2010 | Yukitake | F04C 15/008 |
| | | | | 310/216.049 |
| 2001/0036414 | A1 | 11/2001 | Makino et al. | |

FOREIGN PATENT DOCUMENTS

| | | |
|---|---|---|
| CN | 203774901 U | 8/2014 |
| CN | 203859662 U | 10/2014 |
| EP | 1065376 A2 | 1/2001 |
| JP | H0614482 A | 1/1994 |
| JP | 2001-280249 A | 10/2001 |
| JP | 2005-80451 A | 3/2005 |
| JP | 2005-354870 A | 12/2005 |
| JP | 2006-271105 A | 10/2006 |
| JP | 2006333657 A | 12/2006 |
| JP | 2007-507195 A | 3/2007 |
| JP | 2012124988 A | 6/2012 |
| JP | 2013169043 A | 8/2013 |
| WO | 2013/121754 A1 | 8/2013 |
| WO | 2014/128938 A1 | 8/2014 |

OTHER PUBLICATIONS

Machine Translation for JP 2006-271105; Oct. 22, 2018.*
Supplementary European Search report for Serial No. EP 15 85 9071 dated May 25, 2018.
International Search Report for PCT Serial No. PCT/JP2015/080997 dated Jan. 15, 2016.

* cited by examiner

BRUSHLESS WIPER MOTOR

CROSS-REFERENCE TO RELATED APPLICATIONS

This application is a National Stage application of International Patent Application No. PCT/JP2015/080997, filed on Nov. 4, 2015, which claims priority to Japanese Patent Application No. 2014-229259, filed on Nov. 11, 2014, each of which is hereby incorporated by reference in its entirety.

TECHNICAL FIELD

The present invention relates to a brushless wiper motor for swinging wiper members provided on a windshield.

BACKGROUND ART

Conventionally, a wiper apparatus is mounted on a vehicle such as automotive vehicle, and configured to wipe off foreign objects such as rainwater and dust on a windshield. The wiper apparatus is provided with: wiper members provided on the windshield; and a wiper motor configured to swing the wiper members. By switching on a wiper switch provided in an interior of the vehicle, the wiper motor is rotated, thereby swinging the wiper members on the windshield. Since the wiper motor is installed in a small space covered by a cowl top panel, a brushless motor having a structure suitable for reduction in size and weight is employed.

Such a brushless motor is provided by a technique described in for example Japanese Patent Application Laid-Open Publication No. 2005-080451 (FIG. 1). According to the brushless motor (electric motor) disclosed in Japanese Patent Application Laid-Open Publication No. 2005-080451 (FIG. 1), ribs respectively having through-holes are formed on an outer periphery of a stator, and the ribs are pressed into a housing to fix the stator to the inner periphery of the housing. The number of the ribs is six and they are arranged at equal intervals in a circumferential direction of the stator. The ribs reduce a press-fitting load of the stator to the housing, and suppress the distortion of the housing and of the stator, thereby preventing a drop in efficiency of the electric motor.

SUMMARY

In order to further reduce the size and weight of the wiper motor, the housing should preferably be made out of aluminum. This structure can reduce the size and weight of the wiper motor, and allows heat of the wiper motor, which could be used for a long time, to be released to the outside with ease. However, since the housing is made out of aluminum (low hardness), when the stator made of stacked steel sheets (high hardness) is pressed into an inner peripheral surface of the housing, the housing may be scraped by the stator, and scraped debris tends to be leaved inside the motor as foreign matter.

In the conventional technique described above, which can reduce the press-fitting load of the stator to the housing, since the ribs lack flexibility and fail to sufficiently reduce the press-fitting load, the inner peripheral surface of the housing made out of aluminum tends to be scraped by the stator, and the press-fitting load varies widely depending on dimensional tolerance of the stator. A coupling strength between the housing and the stator varies widely depending on a product-by-product basis, which leads to lower yield.

In the above conventional technique, the press-fitting load of the stator to the housing can be further lessened by reducing the extent of radially outward projection of the ribs, and by improving the accuracy of the stator. This case, however, encounters a problem that the coupling strength between the housing and the stator becomes insufficient, and manufacturing cost of the stator increases.

An object of the present invention is to provide a brushless wiper motor which can reduce a press-fitting load while suppressing an increase in manufacturing cost of a stator, and ensures the sufficient coupling strength between the housing and the stator.

According to one aspect of the present invention, there is provided a brushless wiper motor which swings a wiper, comprising: a housing which rotatably supporting an output shaft; a motor housing unit attached to the housing; a stator housed in the motor housing unit; a rotor disposed inside the stator, the rotor rotating the output shaft; and a pressing claw formed on an outer periphery of the stator, the pressing claw being pressed against an inner periphery of the motor housing unit to fix the stator to the motor housing unit, wherein a base end portion of the pressing claw is connected to the outer periphery of the stator, a tip end portion of the pressing claw serves as a free end and is directed in a circumferential direction of the stator.

In the brushless wiper motor according to another aspect of the present invention, a recess is formed on an outer periphery of the stator, the recess having a pair of walls directed in directions along the outer periphery of the stator, and the pressing claw is formed on at least one of the walls.

In the brushless wiper motor according to another aspect of the present invention, teeth wound with coils are formed on an inner periphery of the stator, and the pressing claw is formed so as to correspond to each of the teeth formed along the inner periphery of the stator.

In the brushless wiper motor according to another aspect of the present invention, a plurality of pressing claws are provided, a tip end portion of one of two pressing claws adjacent to each other is directed in one direction along a periphery of the stator, and a tip end portion of the other of said two pressing claws adjacent to each other is directed in the other direction along the periphery of the stator.

In the brushless wiper motor according to another aspect of the present invention, a plurality of pressing claws are arranged at equal intervals along a circumferential direction of the stator.

In the brushless wiper motor according to another aspect of the present invention, a recess is formed on an outer periphery of the stator, and a projection is formed on an inner periphery of the motor housing unit, the recess and the projection being engaged with each other.

In the brushless wiper motor according to another aspect of the present invention, the housing is made of aluminum and the stator is composed of stacked steel sheets having hardness which are higher in hardness than the housing.

In the brushless wiper motor according to another aspect of the present invention, the stator has an insertion hole extending in an axial direction of the stator, the insertion hole allowing a fixing member to be inserted therein, and the motor housing unit has a fixing hole in which the fixing member is fixed.

In the brushless wiper motor according to another aspect of the present invention, the fixing member is a male screw, and the fixing hole is a female screw hole.

In the brushless wiper motor according to another aspect of the present invention, at least two insertion holes and at least two fixing holes are arranged at equal intervals in a peripheral direction of the stator.

According to the present invention, since the brushless wiper motor which swings a wiper comprises a pressing claw formed on an outer periphery of the stator, the pressing claw being pressed against an inner periphery of the motor housing unit to fix the stator to the motor housing unit, wherein a base end portion of the pressing claw is connected to the outer periphery of the stator, a tip end portion of the pressing claw serves as a free end and is directed in a circumferential direction of the stator, the pressing claw readily warps in a radially inward direction of the stator in comparison with conventional case. Therefore, it is possible to absorb a variation of the press-fitting load depending on dimensional tolerance of the stator, and to reduce a press-fitting load of the stator to the motor housing unit. As a result, even if the housing is made of aluminum, it is possible to prevent its inner peripheral surface of the motor housing unit from being scraped by the stator.

Additionally, the tip end portions of the pressing claws are the free ends, and directed in the circumferential direction of the stator. When the stator starts to be rotated relative to the housing in the direction in which the tip end portions are directed, the tip end portions bite into the inner peripheral surface of the motor housing unit, thereby improving the strength of coupling of the start to the housing, and preventing the stator from is rotated relative to the housing.

DETAILED DESCRIPTION

Hereinafter, the first embodiment of the present invention will be described with reference to the drawings.

Figure 1:
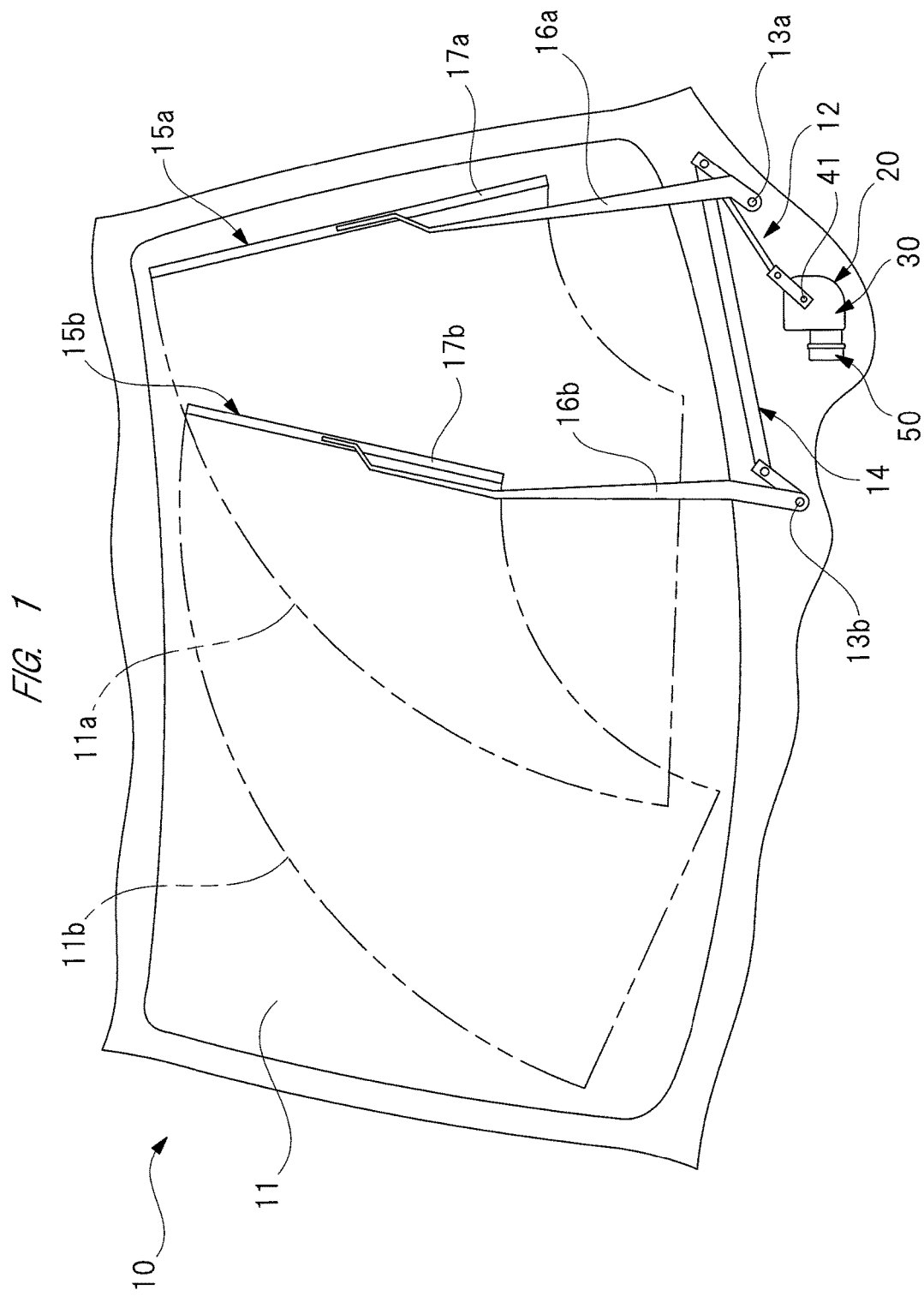
FIG. 1 is a schematic view of an in-vehicle wiper apparatus having a brushless wiper motor according to the present invention.
Figure 2:
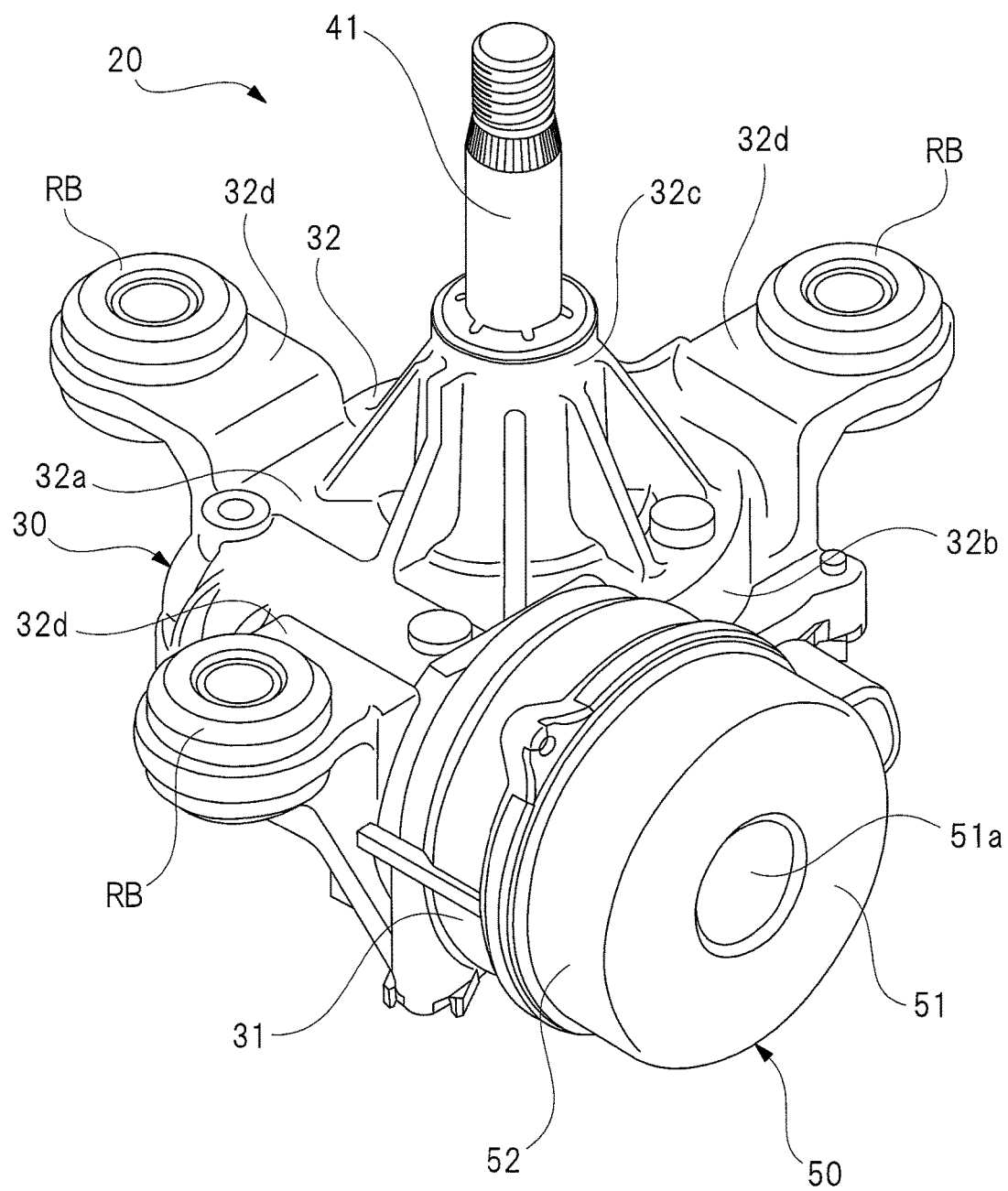
FIG. 2 is a perspective view of the brushless wiper motor of FIG. 1, seen from on the same side as the motor unit.
Figure 3:
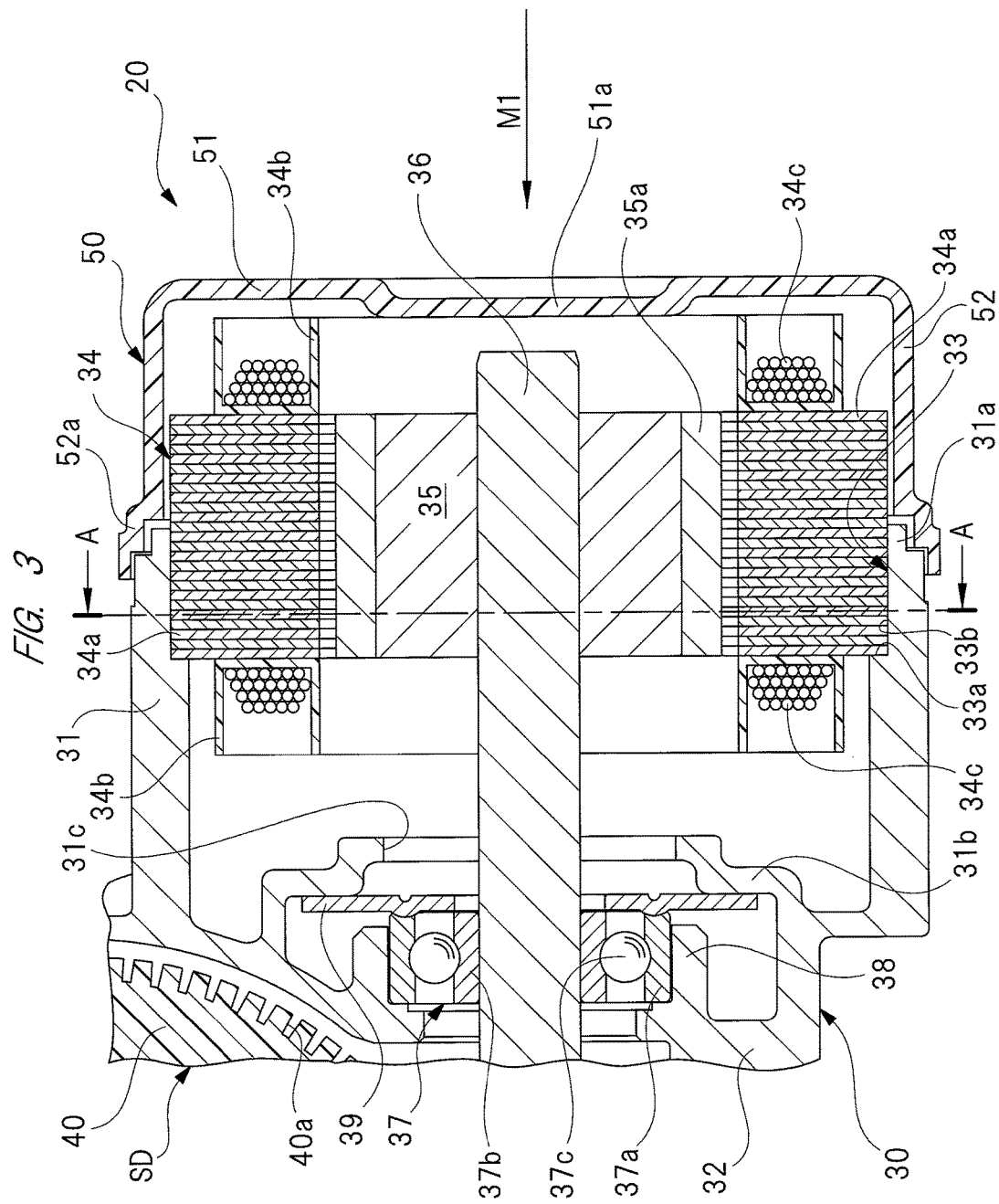
FIG. 3 is an enlarged sectional view of the interior of the motor unit of FIG. 2.
Figure 4:
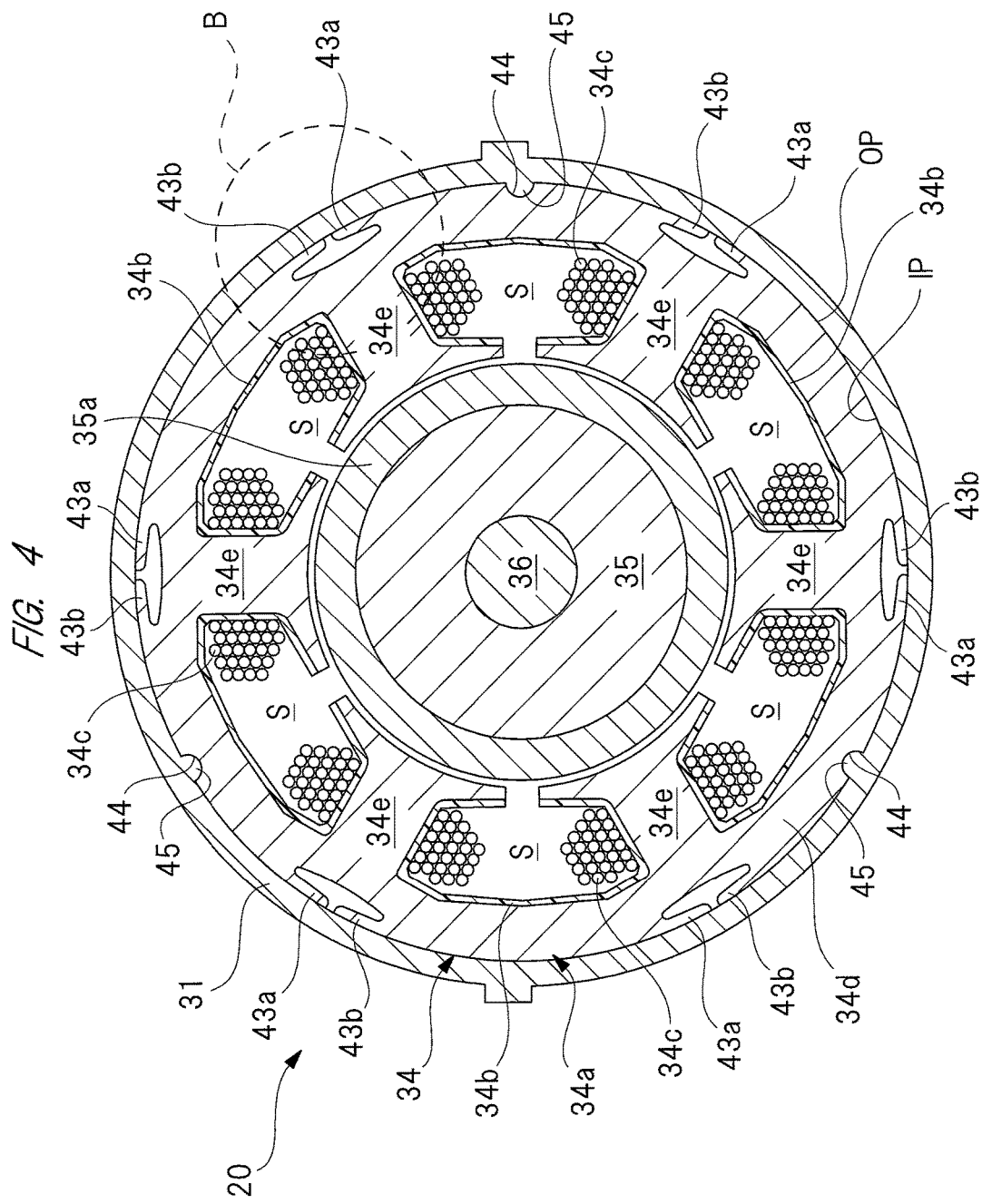
FIG. 4 is a sectional view taken along an A-A line of FIG. 3.
Figure 5:
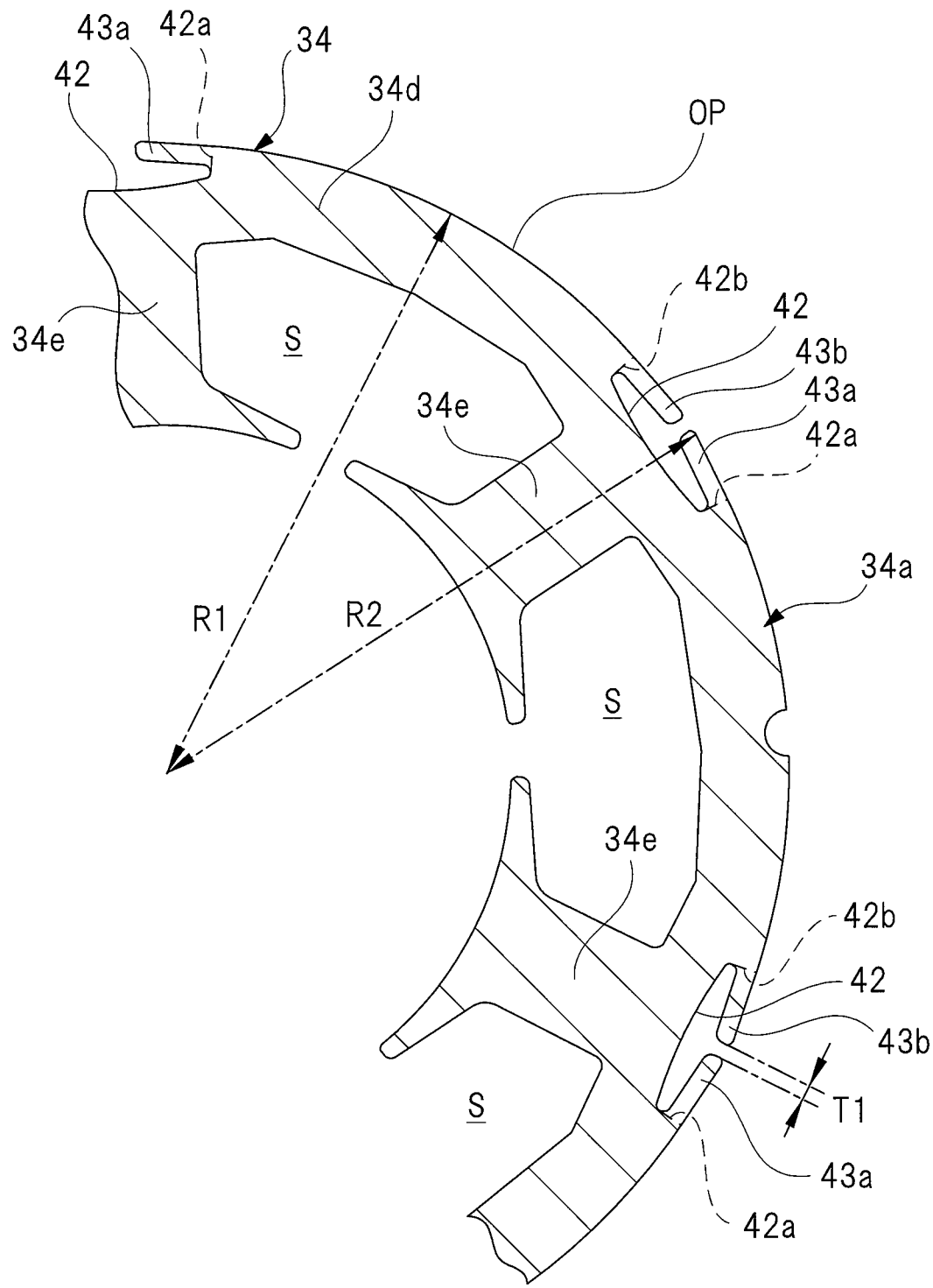
FIG. 5 is an explanatory view of the detailed structure of a stator core.
Figure 6:
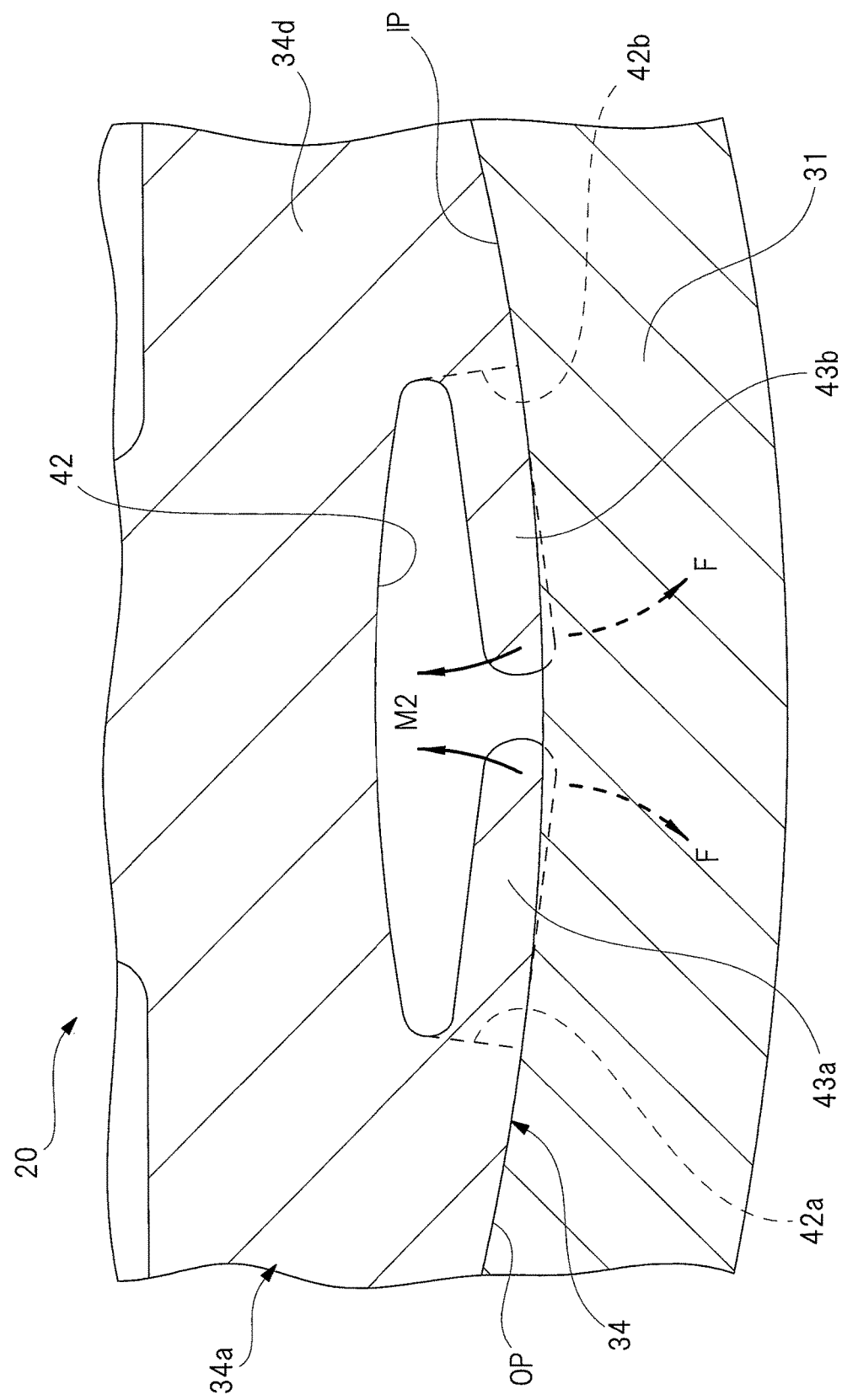
FIG. 6 is an enlarged sectional view of a part indicated by a broken line circle "B" in FIG. 4.
Figure 7:
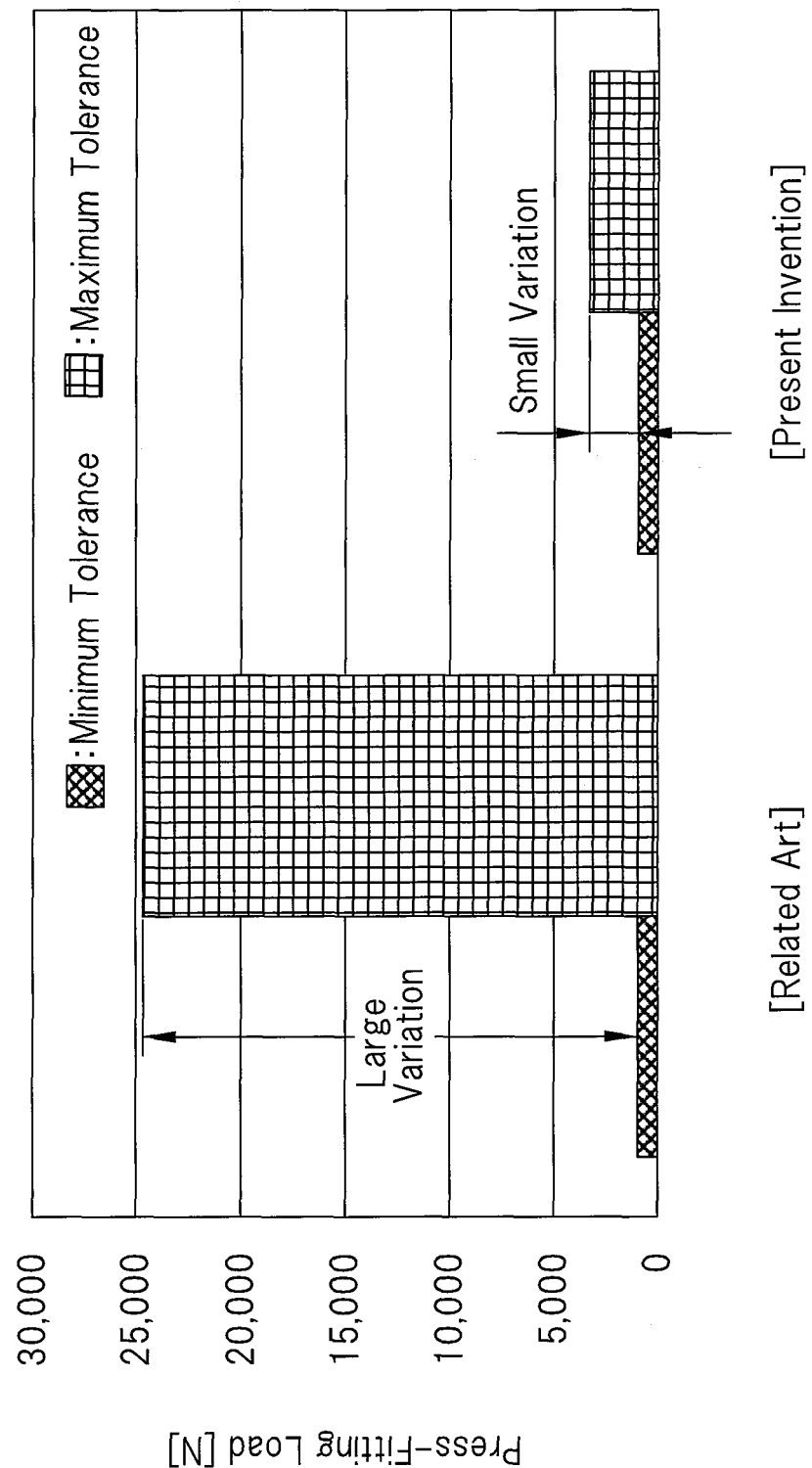
FIG. 7 is a graph of comparison between a variation of a press-fitting load [N] of a conventional technique and a variation of a press-fitting load [N] of the present invention.
Figure 8:
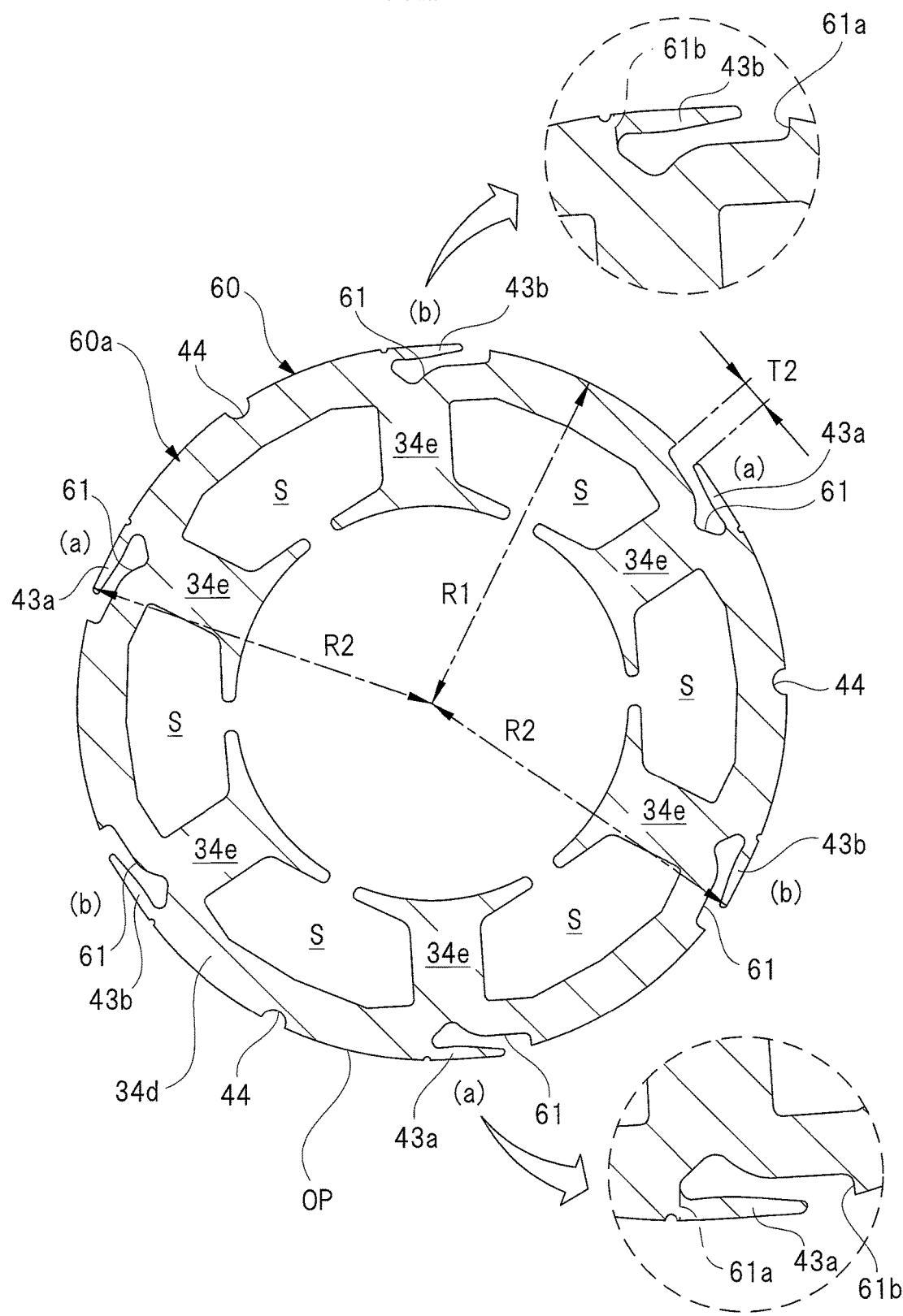
FIG. 8 is an explanatory view of the detailed structure of a stator core of a second embodiment.

FIG. 1 is a schematic view of an in-vehicle wiper apparatus having a brushless wiper motor according to the present invention; FIG. 2 is a perspective view of the brushless wiper motor of FIG. 1, seen from on the same side as the motor unit; FIG. 3 is an enlarged sectional view of the interior of the motor unit of FIG. 2; FIG. 4 is a sectional view taken along an A-A line of FIG. 3; FIG. 5 is an explanatory view of the detailed structure of a stator core; FIG. 6 is an enlarged sectional view of a part indicated by a broken line circle "B" in FIG. 4; FIG. 7 is a graph of comparison between a variation of a press-fitting load [N] of a conventional technique and a variation of a press-fitting load [N] of the present invention; and FIG. 8 is an explanatory view of the detailed structure of a stator core of a second embodiment.

As shown in FIG. 1, a vehicle 10 such as automotive vehicle has a front windshield 11. A wiper apparatus 12 is disposed on the tip end portion of the front windshield 11 of the vehicle 10. By turning on a wiper switch (not shown) disposed in the vehicle interior, the wiper apparatus 12 is driven, and configured to wipe off foreign objects such as rainwater and dust (not shown) away from the front windshield 11.

The wiper apparatus 12 includes: a brushless wiper motor 20; a power transmitting mechanism 14 which transmits an oscillation of the brushless wiper motor 20 to pivot shafts 13a and 13b; and a pair of wipers 15a and 15b respectively having: base ends fixed to the pivot shafts 13a and 13b, and tip end portions to be reciprocated on the front windshield 11 by the oscillation of the pivot shafts 13a and 13b.

The wiper 15a and the wiper 15b are respectively provided to the driver's seat side and the passenger's seat side. The wiper 15a is composed of a wiper arm 16a and a wiper blade 17a attached to the wiper arm 16a, and the wiper 15b is composed of a wiper arm 16b and a wiper blade 17b attached to the wiper arm 16b.

Additionally, when the brushless wiper motor 20 is driven and rotated, the oscillation is transmitted to the pivot shafts 13a and 13b through the power transmitting mechanism 14. This swings the pivot shafts 13a and 13b. Thus, the driving force of the brushless wiper motor 20 is transmitted to the wipers 15a and 15b, which causes the wiper blades 17a and 17b to wipe foreign objects away from predetermined ranges 11a and 11b of the front windshield 11.

As shown in FIGS. 2 and 3, the brushless wiper motor 20 includes: a housing 30 made of aluminum; and a motor cover 50 made of plastic. However, the motor cover 50 may be made of material other than plastic. For example, the motor cover 50 may be made by blanking a steel sheet, which is non-plastic material, by a press machine. The housing 30 and the motor cover 50 are connected to each other with a plurality of fixing screws (not shown). Between the housing 30 and the motor cover 50, a sealing material (not shown), such as O-ring, is provided, and prevents rainwater, etc., from penetrating into the brushless wiper motor 20.

The housing 30 is formed into a predetermined shape by, for example, casting or molding melted aluminum material, and the housing 30 has a motor housing unit 31 and a speed-reduction mechanism housing unit 32. As shown in FIGS. 3 and 4, the motor housing unit 31 has a bottomed cylindrical shape. One end side of the motor housing unit 31 in its axial direction (right-hand side in FIG. 3) is formed with an opening portion in which a stepped and annular cover fitting portion 31a is formed, and on which a fitting portion 52a of the motor cover 50 is fitted. On the other hand, on the other end side of the motor housing unit 31 in its axial direction (left-hand side in FIG. 3), an annular bottom 31*b* is formed, and at the center of the annular bottom 31*b*, a though-hole 31*c* is formed, and a rotating shaft 36 rotatably extends through the though-hole 31*c*.

On the interior of the motor housing unit 31, an annular stepped portion 33 is formed. This stepped portion 33 is composed of: an annular bottom wall 33*a* and a cylindrical side wall 33*b*. A stator core (stator) 34 is disposed inside the stepped portion 33. The stator core 34 is formed into a substantially cylindrical shape by stacking and bonding together a plurality of steel sheets 34*a* made of magnetic material. Roughly half of an outer periphery of the stator core 34 which is closer to the speed-reduction mechanism housing unit 32 along the axial direction is press-fitted to the side wall 33*b* forming an inner periphery of the motor housing unit 31. This fixes the stator core 34 and motor housing unit 31 firmly together. The steel sheets 34*a* have hardness higher than that of the motor housing unit 31 made of aluminum. The fixing structure of the stator core 34 for fixing it to the motor housing unit 31 will be described later.

On both sides of the stator core 34 in its axial direction, resin coil bobbins 34*b* serving as insulators are respectively formed. Each coil bobbin 34*b* is wound with coils 34*c* of three phases, i.e., U-phase, V-phase, and W-phase, which are turned predetermined number of times. The ends (not shown) of these coils 34*c* of the U-phase, V-phase, and W-phase are electrically connected together by a star connection (Y connection) method. A method of connecting the coils 34*c* together is not limited to the star connection method. The coils 34*c*, for example, may be connected by other connection methods such as delta connection (triangular connection) method.

Each coil 34*c* is supplied in a predetermined timing with a drive current from switching elements (not shown) mounted on a control board disposed in the housing 30, and generates an electromagnetic force at the stator core 34. As a result, a rotor 35 inside the stator core 34 is rotated by a predetermined driving torque in a predetermined direction of rotation.

Inside the stator core 34, the rotor 35 is rotatably disposed through a predetermined gap (air gap). The rotor 35 is formed into a substantially columnar shape by stacking and bonding together a plurality of steel sheets (not shown) which are magnetic elements. As shown in FIG. 4, the radial outer surface of the rotor 35 is fitted with a permanent magnet 35*a* of a substantially cylindrical shape.

The permanent magnet 35*a* is disposed such that its magnetic poles are arranged alternately (at 90-degree intervals) along the circumference of the rotor 35. In this manner, the brushless wiper motor 20 is provided as a brushless motor of a surface permanent magnet (SPM) structure, in which the permanent magnet 35*a* is fitted to the surface of the rotor 35. However, in place of the brushless motor of the SPM structure, a brushless motor of an interior permanent magnet (IPM) structure, in which a plurality of permanent magnets are buried in the rotor 35, may also be adopted as the brushless wiper motor 20. Another type of a motor may also be adopted, in which one permanent magnet 35*a* is replaced with four permanent magnets each having a substantially arcuate sectional shape in a direction intersecting with the axis of the rotor 35, which four permanent magnets are arranged at equal intervals along the circumference of the rotor 35 such that their magnetic poles are arranged alternately. These permanent magnets may be arranged in such a way as to provide not only four magnetic poles but also two magnetic poles or more than four magnetic poles.

As shown in FIGS. 3 and 4, one end side of the rotating shaft 36 in its axial direction (right-hand side in FIG. 3) is fixed to the axis of the rotor 35. On the other end side of the rotating shaft 36 in its axial direction (left-hand side in FIG. 3), a worm (not shown) is fitted integrally, which has spiral teeth formed by rolling, etc. The worm fitted on the rotating shaft 36 is disposed closer to the speed-reduction mechanism housing unit 32 than the through-hole 31*c*, and the worm and a worm wheel 40 meshing with the worm collectively constitute a speed-reduction mechanism SD.

Between the rotor 35 and the worm of the rotating shaft 36, a ball bearing 37 is disposed. The ball bearing 37 is composed of: an outer ring 37*a* and an inner ring 37*b*, which are made of steel, and a plurality of steel balls 37*c* set between the outer ring 37*a* and the inner ring 37*b*. The inner ring 37*b* is fixed to the rotating shaft 36 by fixing means (not shown) such as stopper ring and caulking means. The outer ring 37*a* is fitted in a bearing fitting portion 38 disposed between the motor housing unit 31 and the speed-reduction mechanism housing unit 32 of the housing 30.

Here, the ball bearing 37 is pressed and fixed to the bearing fitting portion 38 by an elastic stopper 39. Since the ball bearing 37 is fixed to the bearing fitting portion 38 in this manner, the rotating shaft 36 is incapable of moving in its axial direction.

Therefore, this structure allows the rotating shaft 36 to be smoothly rotated without rattling in its axial direction in the housing 30.

The speed-reduction mechanism housing unit 32 is substantially formed into a bottomed bathtub shape. As shown in FIG. 2, the speed-reduction mechanism housing unit 32 has a bottom 32*a* which is indicated on the upper side in FIG. 2, and a side wall 32*b* encircling the bottom 32*a*. An opening (not shown) is formed on the lower side of the speed-reduction mechanism housing unit 32 in FIG. 2. This opening is closed hermetically with a plastic gear cover (not shown). To the interior of the gear cover, the above described control board is fixed.

On the bottom 32*a* of the speed-reduction mechanism housing unit 32, a boss 32*c* is integrally formed, and projects toward the outside of the speed-reduction mechanism housing unit 32 (i.e., projects upward in FIG. 2). The side wall 32*b* of the speed-reduction mechanism housing unit 32 is provided with three fitting legs 32*d* formed integrally on the side wall 32*b*, and they project toward the boss 32*c* in the radial direction of an output shaft 41. Rubber bushes RB are respectively attached to the fitting legs 32*d*. As a result, in the brushless wiper motor 20 mounted on the vehicle 10 (see FIG. 1), the vibrations of the brushless wiper motor 20 are hardly transmitted to the vehicle 10. Likewise, the vibrations of the vehicle 10 are hardly transmitted to the brushless wiper motor 20.

As shown in FIG. 3, the worm wheel 40 is housed rotatably in the speed-reduction mechanism housing unit 32. The worm wheel 40 is made out of, for example, polyacetal (POM) resin into a substantially disc shape, and has gear teeth 40*a* formed on an outer periphery of the worm wheel 40. The gear teeth 40*a* of the worm wheel 40 are engaged with the teeth of the worm.

The output shaft 41 (see FIG. 2) has a base end side fixed to the axis of the worm wheel 40, and is rotatably supported by the boss 32*c* of the speed-reduction mechanism housing unit 32. The output shaft 41 has a tip end side extending out of the speed-reduction mechanism housing unit 32, and is fitted with the power transmitting mechanism 14 (see FIG. 1) fixed to the tip end portion of the output shaft 41. As a result, the output shaft 41 is rotated by the rotor 35 (see FIG.

3). Specifically, a rotating speed of the rotating shaft 36 is reduced by the speed-reduction mechanism SD, and a high torque output generated by this speed-reduction process is transmitted from the output shaft 41 to the power transmitting mechanism 14, and causes the wipers 15a and 15b(see FIG. 1) to oscillate. In this manner, the speed-reduction mechanism SD transmits the rotation of the rotor 35 to the wipers 15a and 15b through the power transmitting mechanism 14.

As shown in FIGS. 2 and 3, the motor cover 50 is formed into a bottomed cylindrical shape, and has a substantially disc-shaped bottom 51 and a cylindrical wall 52 encircling the bottom 51. At the center of the bottom 51, a recession 51a recessed toward the cylindrical wall 52 is formed to enhance the strength of the bottom 51. In other words, the recession 51a formed on the bottom 51 makes it difficult for the bottom 51 to warp. This prevents the motor cover 50 from resonating with the vibrating brushless wiper motor 20 on operation, thereby improving the stillness of the brushless wiper motor 20.

As shown in FIG. 3, on the same side of the cylindrical wall 52 as the motor housing unit 31, the fitting portion 52a is formed, and fitted on the cover fitting portion 31a of the motor housing unit 31. The fitting portion 52a is annular and formed into the same stepped shape as the cover fitting portion 31a so that the fitting portion 52a mates with the cover fitting portion 31a.

As shown in FIGS. 4 and 5, the steel sheets 34a forming the stator core 34 each have an annular main body 34d. The radius R1 of the outer periphery OP of the main body 34d is determined to be slightly smaller than the radius of the inner periphery IP of the motor housing unit 31. As a result, when the stator core 34 is press-fitted in the motor housing unit 31, the outer periphery OP of the main body 34d is not rubbed against the inner periphery IP of the motor housing unit 31. This prevents the scraping of the inner periphery IP of the motor housing unit 31.

On the radial interior (inner periphery) of the main body 34d, six teeth 34e integrally are formed, each of which is wound with the coils 34c. These teeth 34e are arranged at equal intervals (60-degree intervals) in the circumferential direction of the main body 34d. Between each pair of adjacent teeth 34e, a slot "S" is formed, in which the coils 34c are disposed through the coil bobbin 34b serving as an insulator. In this manner, the brushless wiper motor 20 of this embodiment uses a brushless motor with four magnetic poles and six slots as a driving source.

As shown in FIG. 5, on the outer periphery OP of the main body 34d, a plurality of recesses 42 are formed, which are recessed toward the inner periphery of the main body 34d. Each of these recesses 42 is substantially U-shaped in its sectional shape in a direction intersecting with the axis of the stator core 34, and has a pair of a first wall (wall) 42a and a second wall (wall) 42b. Here, the first wall 42a and the second wall 42b are directed in both directions along the periphery of the stator core 34. Specifically, the first wall 42a is directed in the counterclockwise direction along the periphery of the main body 34d, while the second wall 42b is directed in the clockwise direction along the periphery of the main body 34d.

The first wall 42a and the second wall 42b respectively have a first pressing claw (pressing claw) 43a and a second pressing claw (pressing claw) 43b. These first and second pressing claws 43a and 43b form a fixing structure for fixing the stator core 34 to the motor housing unit 31. The base end portion of the first pressing claw 43a is connected to the first wall 42a, while the base end portion of the second pressing claw 43b is connected to the second wall 42b. In other words, respective base end portions of the first and second pressing claws 43a and 43b are connected to an outer periphery of the steel sheet 34a.

As a result, in the first and second pressing claws 43a and 43b adjacent to each other, the tip end portion of the first pressing claw 43a is directed in one direction (counterclockwise direction) along the periphery of the stator core 34. The tip end portion of the second pressing claw 43b of the adjacent first and second pressing claws 43a and 43b, on the other hand, is directed in the other direction (clockwise direction) along the periphery of the stator core 34.

The distance R2 between each of the tip end portions, i.e., free ends of the first and second pressing claws 43a and 43b and the axis of the stator core 34 is determine to be slightly larger than the radius of the inner periphery IP of the motor housing unit 31. As a result, when the stator core 34 is press-fitted in the motor housing unit 31, the tip end portions of the first and second pressing claws 43a and 43b are pressed against the inner periphery IP of the motor housing unit 31.

One first pressing claw 43a and one second pressing claw 43b collectively form one set of pressing claws. Six sets of pressing claws are thus provided in total. A gap formed between the tip end portion of the first pressing claw 43a and the tip end portion of the second pressing claw 43b is equivalent to a distance t1. This distance t1 is the distance with which the sufficient strength of a die (not shown) used for press working the steel sheets 34a can be ensured. Each set of the first pressing claw 43a and second pressing claw 43b are provided so as to correspond to each of teeth 34e. Specifically, each set of the first pressing claw 43a and second pressing claw 43b are disposed on a part of the main body 34d on which each of teeth 34e is formed along the periphery of the main body 34d. The sets of the first pressing claw 43a and second pressing claw 43b are, therefore, arranged at equal intervals (60-degree intervals) in the circumferential direction of the main body 34d.

Furthermore, on the outer periphery OP of the main body 34d, as shown in FIG. 4, three engaging recesses 44 recessed toward the inner periphery of the main body 34d are formed. These recesses 44 are arranged at equal intervals (120-degree intervals) in the circumferential direction of the main body 34d, and are each disposed on a part of main body 34d on which each slot "S" between adjacent teeth 34e is formed along the periphery of the main body 34d. The engaging recesses 44 are respectively engaged with three engaging projections 45, which are formed on the inner periphery IP of the motor housing unit 31 and project radially inward from the motor housing unit 31. These three engaging recesses 44 and three engaging projections 45 form recesses/projections of the present invention which are engaged with each other.

Additionally, the steel sheets 34a are stacked in such a way as to match their teeth 34e, first and second pressing claws 43a and 43b, and engaging recesses 44 in place and are fixed firmly to each other, using an adhesive, etc. (not shown).

Here, when the roughly half of stator core 34 which is closer to the speed-reduction mechanism housing unit 32 is press-fitted in the motor housing unit 31, as indicated by an actual line arrow M1 in FIG. 3, respective tip end portions of the first and second pressing claws 43a and 43b warp toward the interior of the recession 42, as indicated by actual line arrows M2 in FIG. 6. Since the first and second pressing claws 43a and 43b are long and narrow and extend in the circumferential direction of the stator core 34, the first and second pressing claws 43a and 43b readily warp in the radial direction of the stator core 34 (i.e., vertical direction in FIG. 6). Since only the roughly half of stator core 34 which is closer to the speed-reduction mechanism housing unit 32 is press-fitted in the motor housing unit 31, the press-fitting load of the stator core 34 to the motor housing unit 31 turns out to be small.

After the stator core 34 is press-fitted in the motor housing unit 31, the tip end portions of the first and second pressing claws 43a and 43b apply a pressing force to the inner periphery IP of the motor housing unit 31, as indicated by broken line arrows "F" in FIG. 6. As a result, the tip end portions of the first and second pressing claws 43a and 43b, which have high hardness, bite into the inner periphery IP of the motor housing unit 31, which has low hardness. In this manner, the stator core 34 is fixed completely to the motor housing unit 31.

At this time, the tip end portion of the first pressing claw 43a faces in one direction (counterclockwise direction) along the periphery of the stator core 34, and the tip end portion of the second pressing claw 43b faces in the other direction (clockwise direction) along the periphery of the stator core 34. This arrangement certainly prevents the relative rotation of the stator core 34 to the motor housing unit 31 after the stator core 34 is press-fitted in the motor housing unit 31 while reducing the press-fitting load of the stator core 34 to the motor housing unit 31.

Here, the fixing structure for fixing the stator core 34 to the motor hosing unit 31 according to this embodiment is the structure in which respective tip end portions of the first and second pressing claws 43a and 43b serve as the free ends not connected to anything. This structure gives the first and second pressing claws 43a and 43b a greater warp margin, in which dimensional tolerance of the steel sheets 34a can be offset easily by the elastic deformation of the first and second pressing claws 43a and 43b, thereby manufacturing the steel sheets 34a without high precision.

As shown in FIG. 7, in the present invention, under the condition that dimensional tolerance, such as outline dimension tolerance, of the stator core 34 is the minimum (minimum tolerance), and under the condition that dimensional tolerance of the same is the maximum (maximum tolerance), the respective press-fitting loads [N] measured about 1,000 [N] and about 3,000 [N]. That is, this demonstrates that a variation of the press-fitting load [N] to the motor housing unit 31, which variation results from a variation in dimensional tolerance of the stator core 34, is within a range of about 2,000 [N] (small variation). This is because that, as mentioned above, the tip end portions of the first and second pressing claws 43a and 43b serve as the free ends not connected to anything.

In contrast, in the conventional technique, the stator core is not provided with pressing claws which have tip end portions serving as free ends as described in this embodiment, but the stator core is provided with ribs having through-holes. In the conventional technique, the press-fitting load [N] is measured at about 1,000 [N] and about 24,000 [N] respectively for the dimensional tolerance, such as outline dimension tolerance, of the stator core being the minimum (minimum tolerance), and for the dimensional tolerance of the stator core being the maximum (maximum tolerance). This demonstrates that a variation of the press-fitting load [N] to the housing, in which variation results from a variation in the dimensional tolerance of the stator, is within a range of about 23,000 [N] (large variation).

In this manner, the brushless wiper motor 20 reduces a variation of the press-fitting load [N] of the stator core 34 to the motor housing unit 31, thereby reducing the driving energy of a manufacturing apparatus, and achieving significant energy-saving.

As described in detail above, according to the brushless wiper motor 20 of this embodiment, the first and second pressing claws 43a and 43b are formed on the outer periphery OP of the steel sheets 34a forming the stator core 34, the first and second pressing claws 43a and 43b being pressed against the inner periphery IP of the motor housing unit 31 to fix the stator core 34 to the motor housing unit 31. The base end portions of the first and second pressing claws 43a and 43b are respectively connected to the first and second walls 42a and 42b formed on the outer periphery OP of the steel sheets 34a, and the tip end portions of the first and second pressing claws 43a and 43b are left serving as the free ends which are directed in the circumferential direction of the stator core 34.

As a result, this allows the first and second pressing claws 43a and 43b to warp more easily toward the radial interior of the stator core 34. Therefore, a variation of the press-fitting load [N] resulting from a variation in dimensional tolerance of the stator core 34 is offset as the press-fitting load [N] of the stator core 34 to the motor housing unit 31 is reduced. This suppresses the scraping of the inner peripheral surface of the motor housing unit 31 in the housing 30 made of aluminum. Even if the inner peripheral surface of the motor housing unit 31 is scraped by the press-fitted stator core 34, the stepped portion 33 seals in debris created by the scraping of the motor housing unit 31. Specifically, such debris are crushed and sealed in between the stator core 34 and the bottom 33a and side wall 33b.

According to the brushless wiper motor 20 of this embodiment, the teeth 34e wound with the coils 34c are formed on the inner periphery of the stator core 34 and each set of the first and second pressing claws 43a and 43b is formed on the part of stator core 34 on which each of the teeth 34e is formed along the periphery of the stator core 34.

As a result, this allows the fixing structure for fixing the stator core 34 to the motor housing 31 to be formed without overlapping a part of the stator core 34 where a magnetic circuit is formed. Therefore, this prevents such a problem that the efficiency of the brushless wiper motor 20 drops.

Furthermore, the tip end portion of the first pressing claw 43a is directed in one direction along the periphery of the stator core 34, and the tip end portion of the second pressing claw 43b is directed in the other direction along the periphery of the stator core 34. Therefore, this certainly prevents the relative rotation of the stator core 34 to the motor housing unit 31.

Furthermore, the sets of first and second pressing claws 43a and 43b are formed at equal intervals along the periphery of the stator core 34. Therefore, the stator core 34 can be centered in concentric with the motor housing unit 31, and press-fitted in the motor housing unit 31 in a balanced manner.

Furthermore, the recesses/projections (the engaging recesses 44 and the engaging projections 45) which are respectively engaged with each other are formed on the outer periphery OP of the stator core 34 and the inner periphery IP of the motor housing unit 31. As a result, the recesses/projections help regulating the relative rotation of the stator core 34 to the motor housing unit 31, thereby further ensuring the prevention of the relative rotation of the stator core 34 to the motor housing unit 31. The recession/projection may be provided as an engaging portion in which a pin is press-fitted and fixed. Specifically, both engaging recession 44 and engaging projection 45 are provided as recesses, in which a pin, which is a separate element, is fitted to engage with both recesses. The recession/projection provided as such an engaging portion also helps regulating the relative rotation.

Additionally, the housing 30 is made of aluminum, and the stator core 34 is composed of the stacked steel sheets 34*a* having hardness higher than that of the housing 30. The brushless wiper motor 20 is thus reduced in size and weight and is significantly improved in its heat dissipation performance.

Next, the second embodiment of the present invention will be described in detail with reference to the drawings. Additionally, portions the same in function as those of the first embodiment are respectively denoted by the same reference numbers as those of the first embodiment, and detail description thereof is omitted in this embodiment.

FIG. 8 is an explanatory view of the detailed structure of a stator core of a second embodiment.

As shown in FIG. 8, a stator core (stator) 60 of the second embodiment has a fixing structure for fixing the stator core 60 to the motor housing unit 31 (see FIG. 4) which is different from the fixing structure of the first embodiment. The stator core 60 is composed of stack steel sheets 60*a*, and six peed-reducing recessed toward the inner periphery of the main body 34*d* are formed on the outer periphery OP of the main body 34*d* of the steel sheet 60*a*. Each recession 61 is substantially U-shaped in its sectional shape in a direction intersecting with the axis of the stator core 60, and has a first wall (wall) 61*a* and a second wall (wall) 61*b*.

Here, the first wall 61*a* and the second wall 61*b* are directed in both directions along the periphery of the stator core 60. Specifically, the first wall 61*a* is directed in the counterclockwise direction along the periphery of the main body 34*d*, and the second wall 61*b* is directed in the clockwise direction along the periphery of the main body 34*d*.

Among the recesses 61 arranged at equal intervals (60-degree intervals) in the circumferential direction of the main body 34*d*, the recesses 61 corresponding to parts of the main body 34*d* indicated by (a) in FIG. 8 have the respective first pressing claws 43*a* formed on the first walls 61*a*. Likewise, the recesses 61 corresponding to parts of the main body 34*d* indicated by (b) in FIG. 8 have the respective second pressing claws 43*b* formed on the second walls 61*b*. In short, according to this embodiment, each recession 61 has one pressing claw.

The first pressing claws 43*a* and the second pressing claws 43*b* are thus arranged alternately along the periphery of the main body 34*d*. In this arrangement, a gap, which is a distance t2, larger than the gap, which is the distance t1, of the first embodiment can be formed at each recession 61 (t2>t1).

The second embodiment having the above configuration offers the same effect offered by the first embodiment. According to the second embodiment, since the large gap, i.e., distance t2 can be formed at the recess 61, the service life of a die (not shown) used for press working can be extended further than in the case of the first embodiment.

Next, the third embodiment of the present invention will be described in detail with reference to the drawings. Additionally, portions the same in function as those of the first embodiment are respectively denoted by the same reference numbers as those of the first embodiment, and detail description thereof is omitted in this embodiment.

Figure 9:
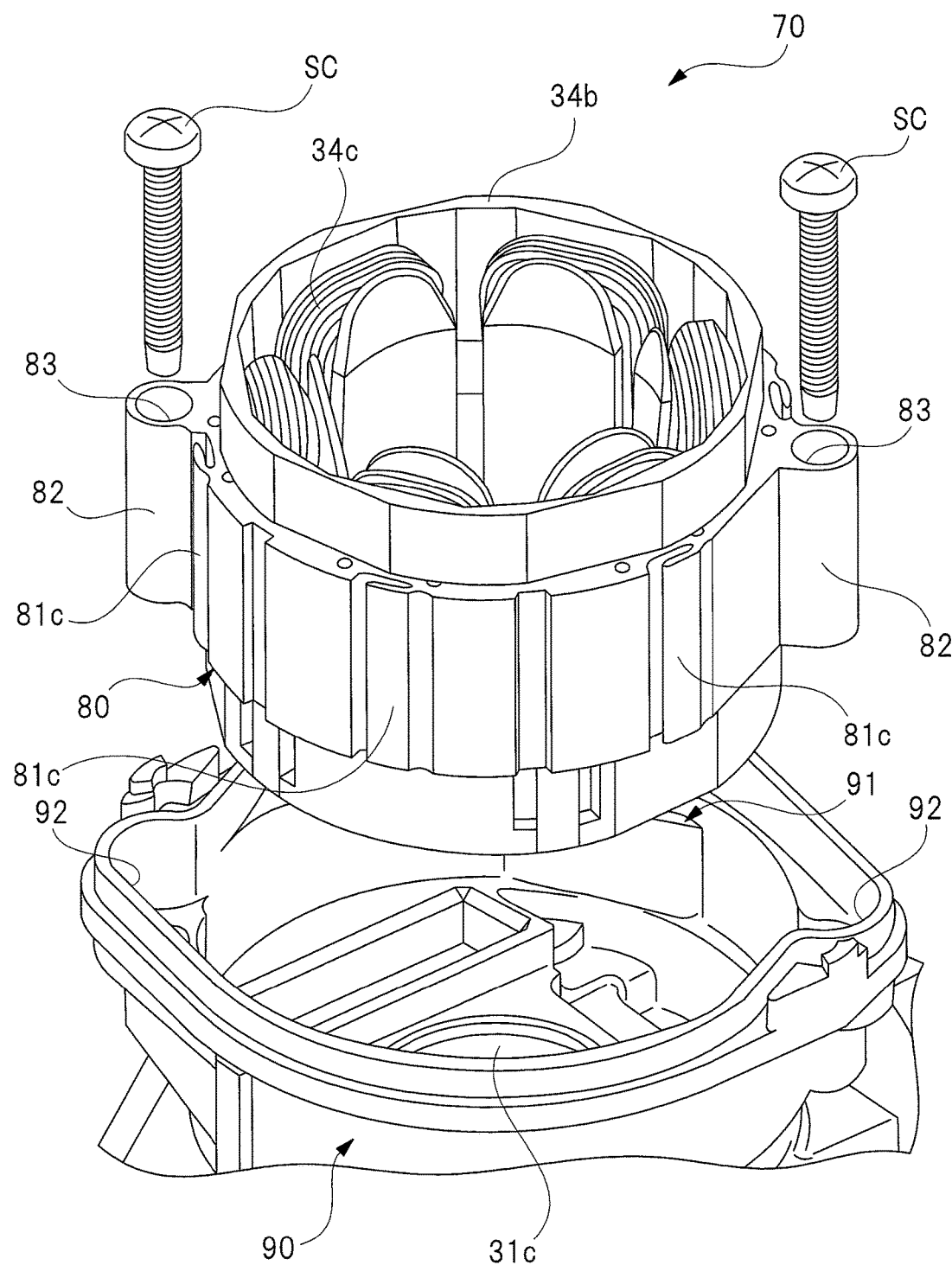
FIG. 9 is an explanatory view of the fixing structure of a stator core of a third embodiment for fixing it to a motor housing unit.
Figure 10:
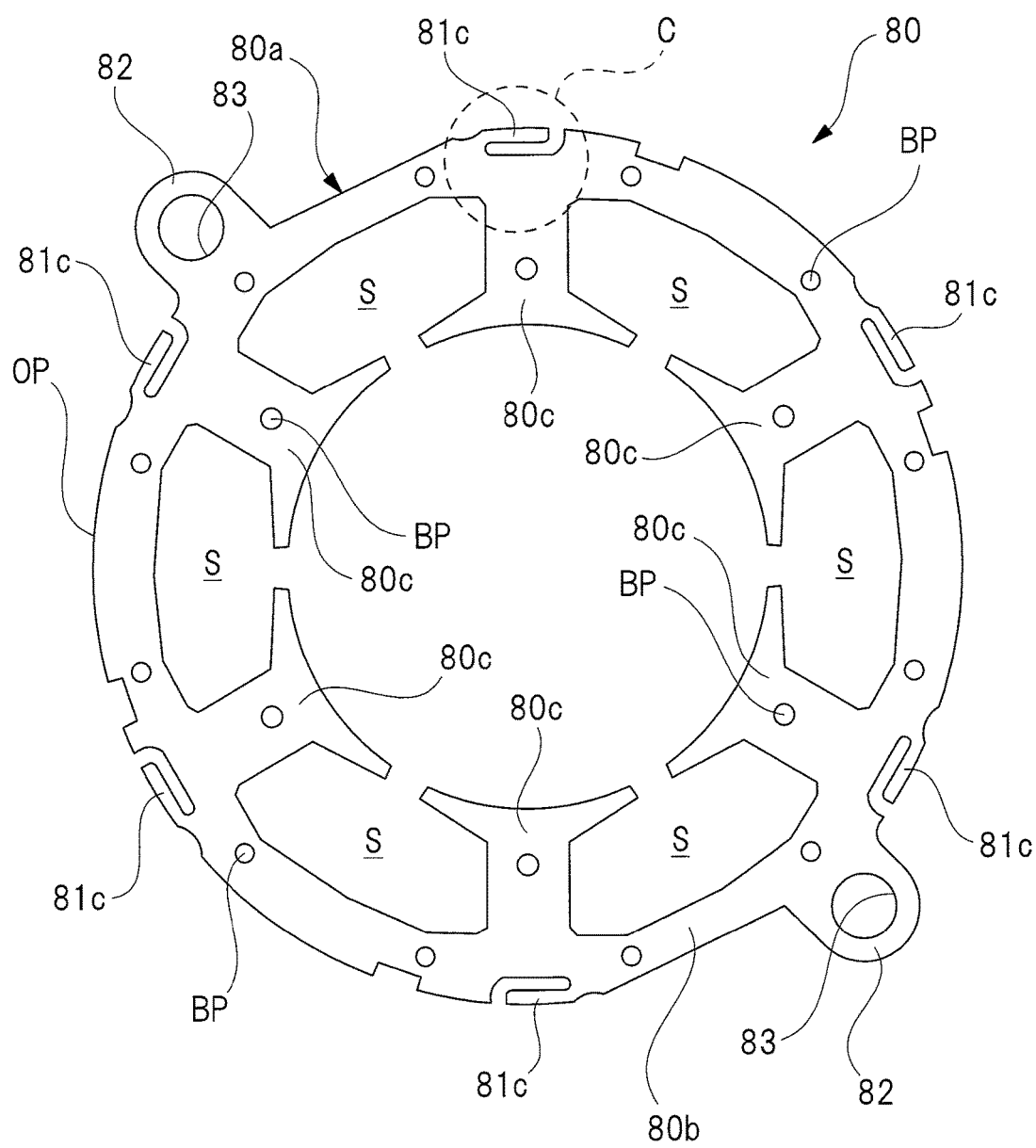
FIG. 10 is an explanatory view of the detailed structure of the stator core of FIG. 9.
Figure 11:
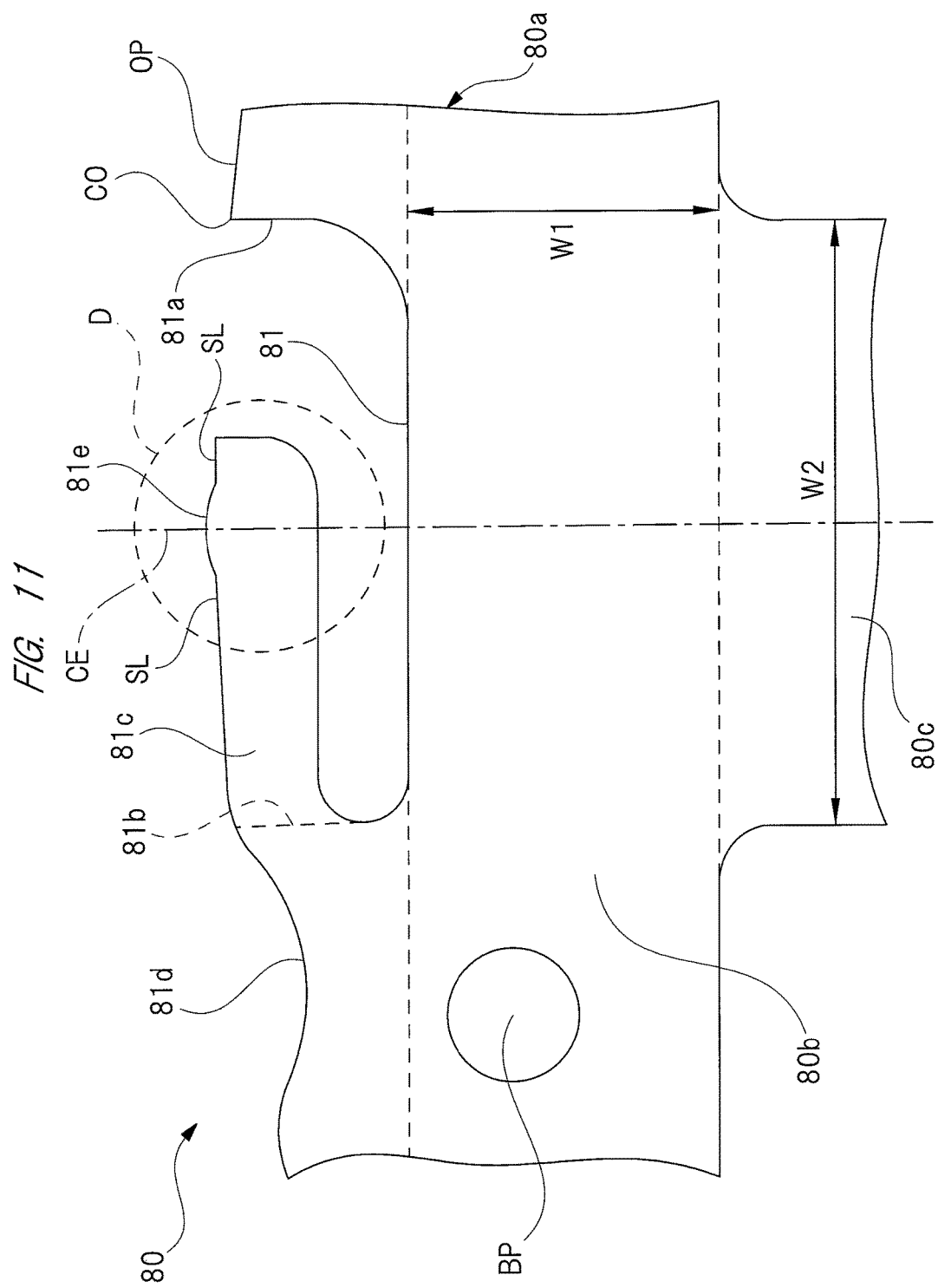
FIG. 11 is an enlarged view of a part indicated by a broken line circle "C" in FIG. 10.
Figure 12:
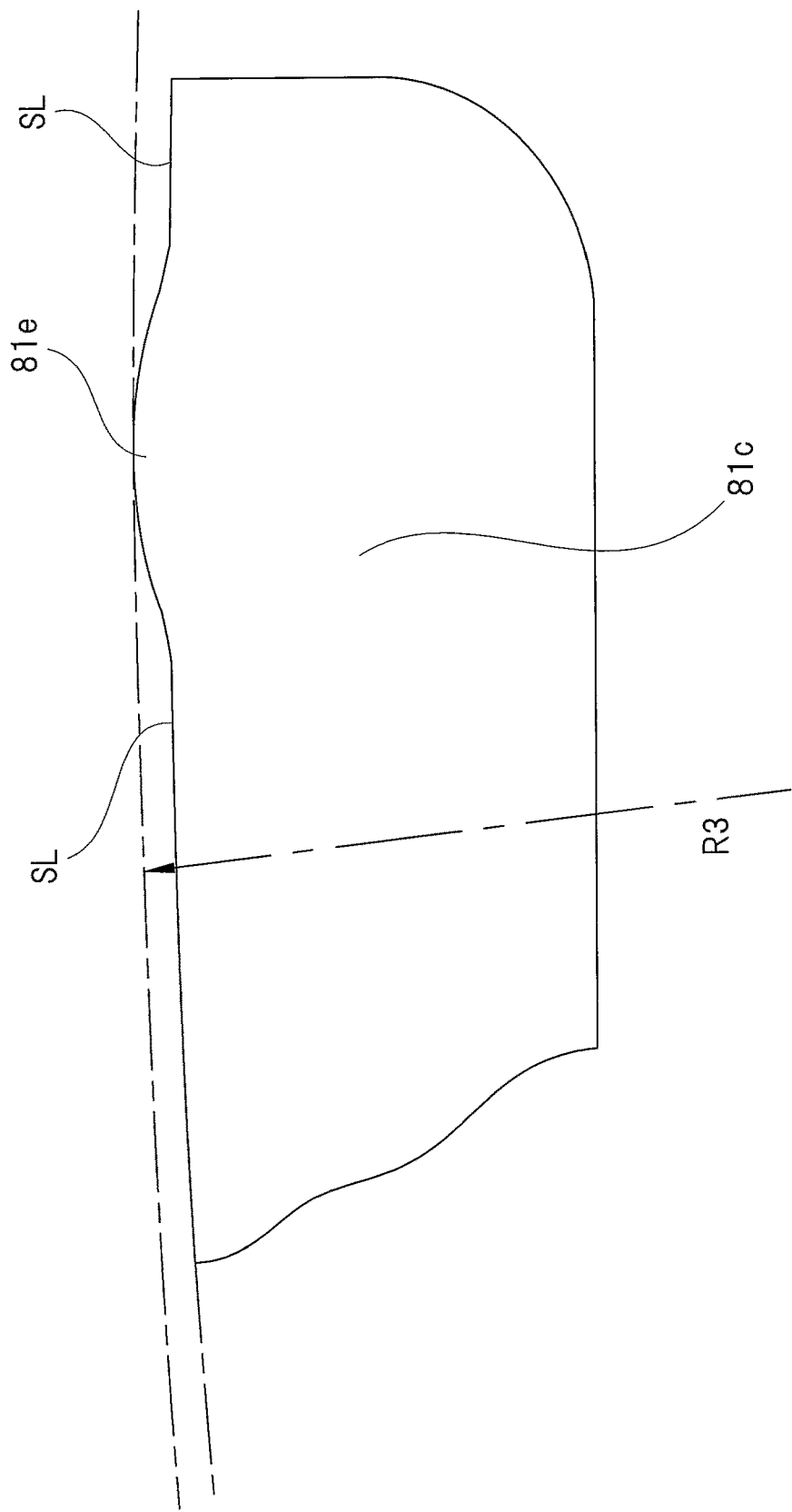
FIG. 12 is an enlarged view of a part indicated by a broken line circle "D" in FIG. 11.
Figure 13:
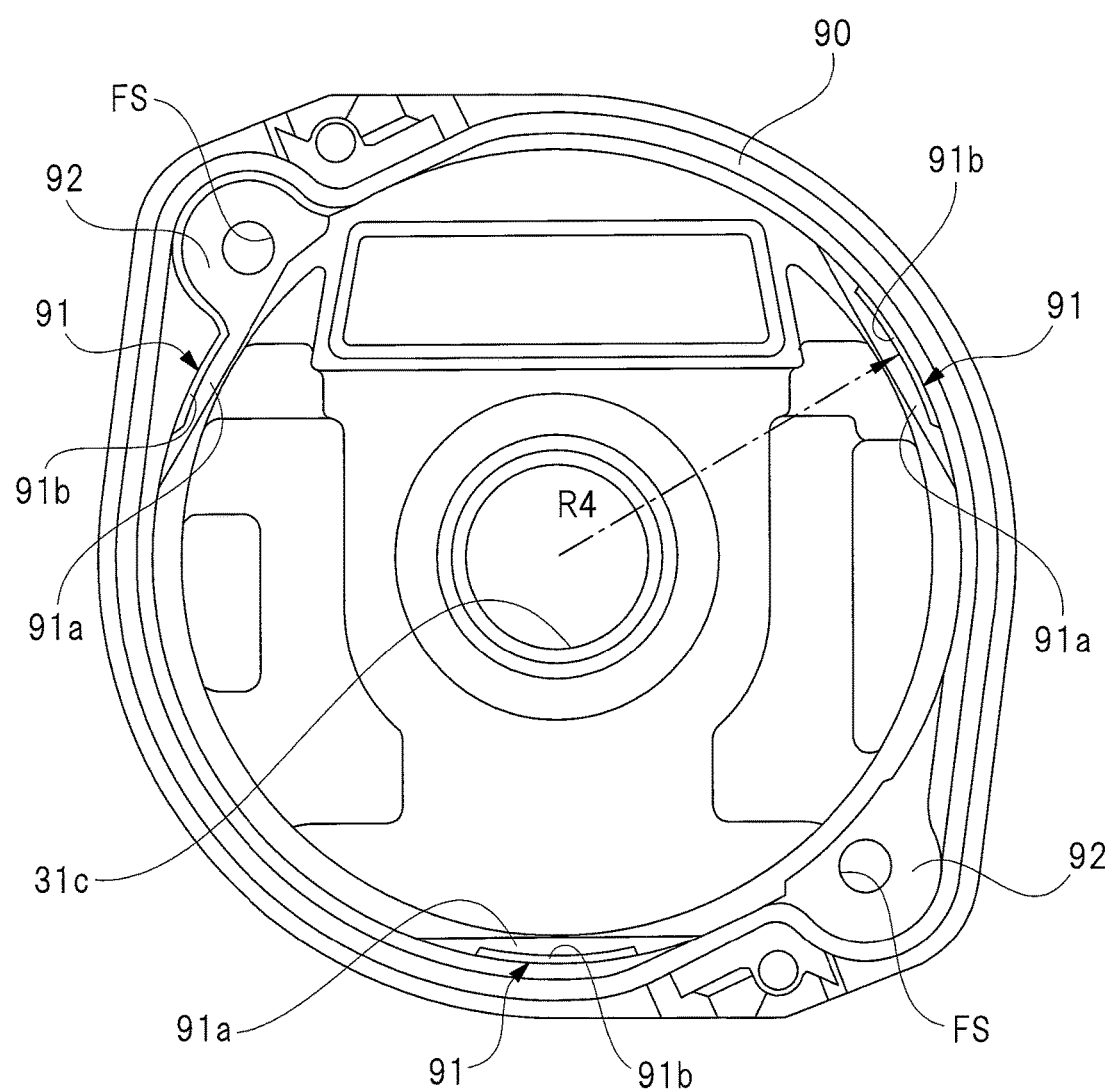
FIG. 13 is an explanatory view of the detailed structure of the motor housing unit of FIG. 9.
Figure 14:
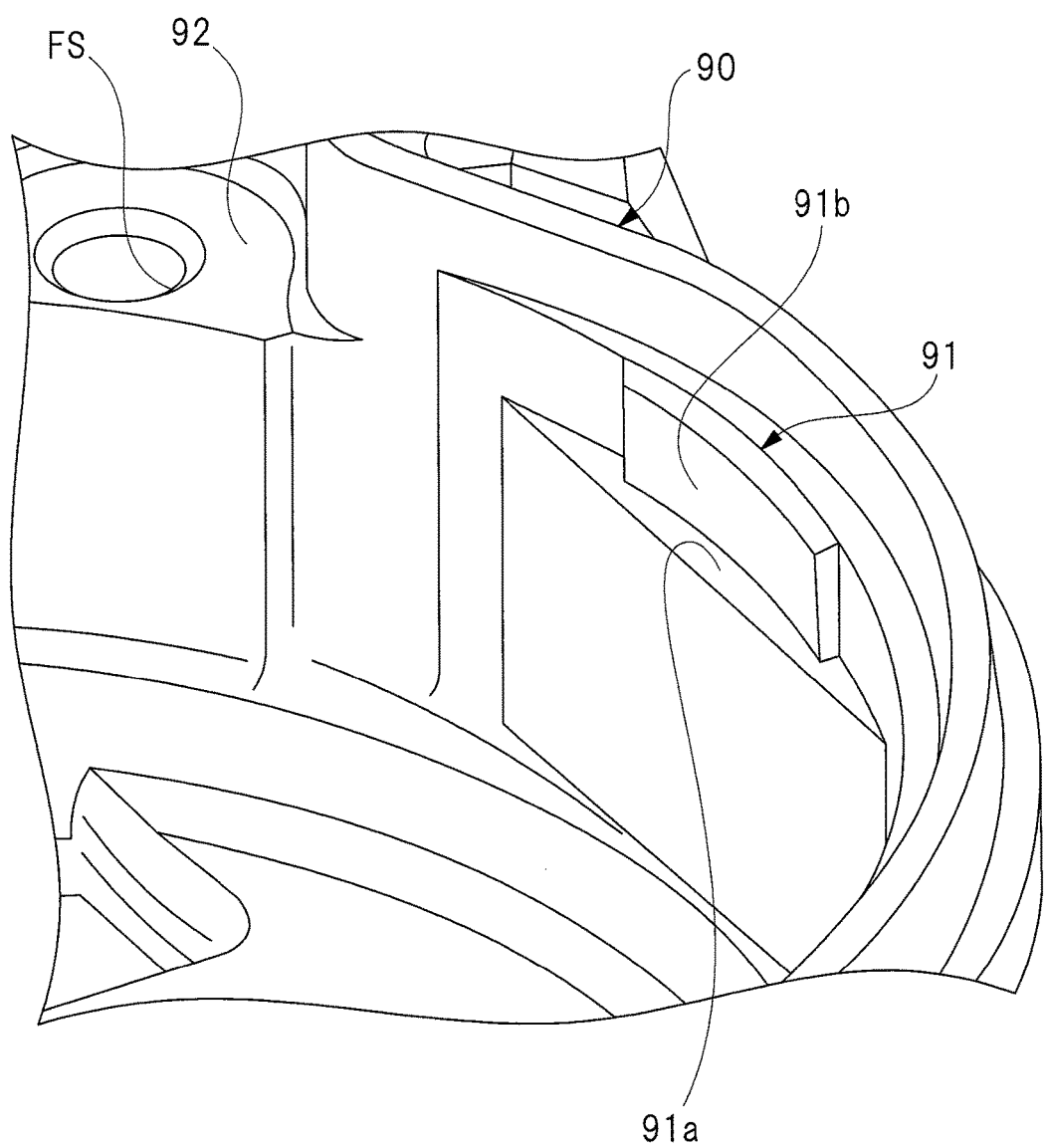
FIG. 14 is an enlarged perspective view of a side wall to which the stator core of the motor housing unit of FIG. 13 is press-fitted.
Figure 15:
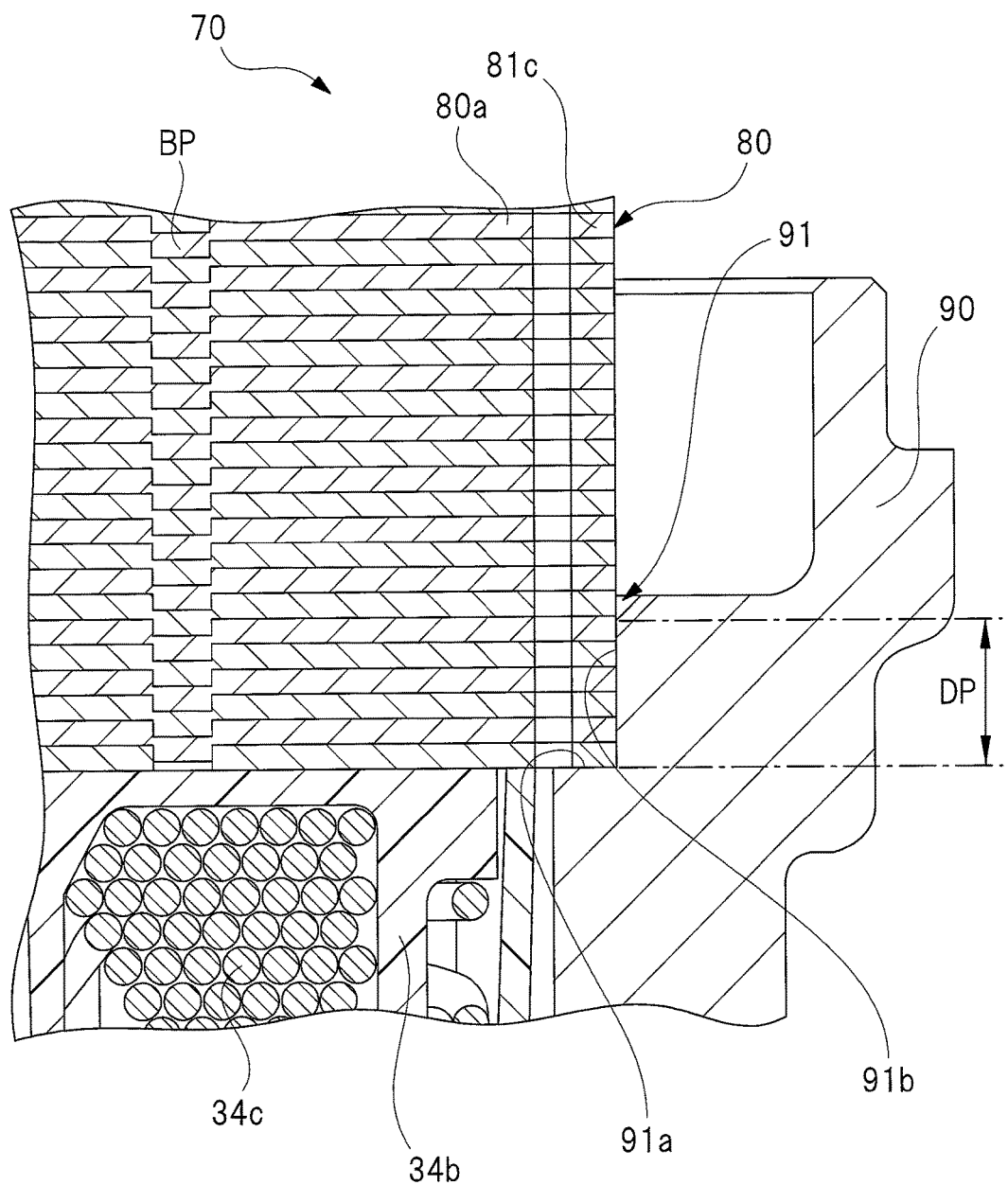
FIG. 15 is an enlarged sectional view of the stator core and the motor housing unit of FIG. 9 in their fixed state.

FIG. 9 is an explanatory view of the fixing structure of a stator core of a third embodiment for fixing it to a motor housing unit; FIG. 10 is an explanatory view of the detailed structure of the stator core of FIG. 9; FIG. 11 is an enlarged view of a part indicated by a broken line circle "C" in FIG. 10; FIG. 12 is an enlarged view of a part indicated by a broken line circle "D" in FIG. 11; FIG. 13 is an explanatory view of the detailed structure of the motor housing unit of FIG. 9; and FIG. 14 is an enlarged perspective view of a side wall to which the stator core of the motor housing unit of FIG. 13 is press-fitted; and FIG. 15 is an enlarged sectional view of the stator core and the motor housing unit of FIG. 9 in their fixed state.

As shown in FIG. 9, a brushless wiper motor 70 of the third embodiment has a stator core 80 and a motor housing unit 90 which are different in shape from the stator core and motor housing unit of the brushless wiper motor 20 of the first embodiment (see FIGS. 3 and 4) and has the fixing structure of the stator core 80 and motor housing unit 90 which is different from the fixing structure of the stator core and motor housing unit of the first embodiment. Specifically, according to the third embodiment, in addition to press fitting of the stator core 80 into the motor housing unit 90, a pair of male screws SC are respectively screwed into a pair of female screws FS of the motor housing unit 90 (see FIG. 13). This helps fixing the stator core 80 and the motor housing unit 90 firmly together.

The stator core 80 is made by stacking a plurality of steel sheets 80*a* whose shape is shown in FIG. 10. The steel sheets 80*a* form the stator core 80 has an annular main body 80*b* indicated by broken lines in FIG. 11. The annular main body 80*b* functions as a magnetic circuit. The width W1 of the main body 80*b* in the radial direction of the steel sheets 80*a* is determined to be ½ or more of the width W2 of each of teeth 80*c*. This width setting allows the brushless wiper motor 70 to achieve sufficient power output.

A plurality of recesses 81 are formed on the outer periphery OP of the main body 80*b*, and recessed toward the inner periphery of the main body 80*b*. The recesses 81 are respectively arranged so as to correspond to six teeth 80*c*. Each recess 81 has a pair of a first wall (wall) 81*a* and a second wall (wall) 81*b* which are directed in both directions along the periphery of the stator core 80 (steel sheet 80*a*). The first wall 81*a* is directed in the counterclockwise direction along the periphery of the main body 80*b*, and the second wall 81*b* is directed in the clockwise direction along the periphery of the main body 80*b*.

To the second wall 81*b* of each recess 81, the base end portion of a pressing claw 81*c* is connected. In other words, the base end portion of each pressing claw 81*c* is connected to the outer periphery of the steel sheet 80*a*, and the tip end portion of each pressing claw 81*c* is directed in the clockwise direction along the periphery of the stator core 80. In this manner, according to the brushless wiper motor 70 of the third embodiment, six pressing claws 81*c* are all directed in the same direction (clockwise direction).

A depression 81*d* is formed on the outer periphery OP of the main body 80*b* and on the base end portion of each pressing claw 81*c*, and depressed toward the inner periphery of the main body 80*b*. Each depression 81*d* is formed to reduce the width of the base end portion of each pressing claw 81*c*, thereby reducing the rigidity of the base end portion of the pressing claw 81*c*. This decreases press-fitting load of the stator core 80 to the motor housing unit 90.

On the tip end portion of each pressing claw 81*c*, a press-fitting projection 81*e* is integrally formed, and projects toward the outside of the stator core 80 in its radial direction. Each press-fitting projection 81*e* is of an arcuate shape with a predetermined radius and press-fitted in the motor housing unit 90. A circumscribed circle in contact with the crown of the press-fitting projection 81e has a radius R3 (see FIG. 12) which is determined to be slightly larger than the radius R4 (see FIG. 13) of an inscribed circle in contact with side walls 91b of the motor housing unit 90 (R3>R4). Each press-fitting projection 81e is thus press-fitted to be fixed to each side wall 91b.

As shown in FIG. 11, each press-fitting projection 81e is disposed on the center line CE of each of teeth 80c, and formed on the tip end portion of each pressing claw 81c in its longitudinal direction (horizontal direction in FIG. 11). A gap is formed between a straight line part SL of the pressing claw 81c and the inner wall of the motor housing unit 90. This straight line part SL extending at both sides of the press-fitting projection 81e, as shown in FIG. 12, serves as a wall such that scraped debris (foreign objects) which are produced when the stator core 80 is press-fitted in the motor housing unit 90 are held between the straight line part SL and the inner wall of the motor housing unit 90. This prevents the scraped debris (foreign objects) from slipping out of the motor housing unit 90.

Here, between the first wall 81a of each recess 81 and the outer periphery OP of the main body 80b, a pointed corner CO, which is not arcuate (rounded), is formed. In this manner, by adopting such a non-arcuate and pointed corner CO as above, the structure of a die (not shown) used for blanking the steel sheets 80a is simplified, thereby facilitating control of the die.

As shown in FIG. 10, on the outer periphery OP of the main body 80b, a pair of screw fixing portions 82 is integrally formed in such a way as to project outward in the radial direction of the main body 80b. The screw fixing portions 82 have respective insertion holes 83 which extend in the axial direction of the stator core 80. The male screws SC (see FIG. 9) are respectively inserted in these insertion holes 83. The male screws SC form fixing members of the present invention, and are tightened with a fastening tool, such as Phillips-head driver (not shown). The insertion holes 83 are arranged at equal intervals (180-degree intervals) in the circumferential direction of the stator core 80. In other words, the insertion holes 83 are arranged opposite to each other across the center of the stator core 80.

Here, each steel sheet 80a has circular recesses/projections BP. When the steel sheets 80a are stacked, their recesses/projections BP are engaged with each other. As a result, this structure keeps the steel sheets 80a in its stacked state and positions the steel sheets 80a so that they are set in their right positional relation to each other.

As shown in FIG. 13, three overhanging portions 91 are formed on the interior of the motor housing unit 90. These overhanging portions 91 overhang inward from the motor housing unit 90, and function as stepped portions for fixing the stator core 80 in the motor housing unit 90. The three overhanging portions 91 are arranged at equal intervals (120-degree intervals) around the through-hole 31c, and hold the stator core 80 on its three parts to prevent it from rattling. As shown in FIG. 14, each overhanging portion 91 is composed of a bottom wall 91a which supports the stator core 80 in its axial direction, and the side wall 91b to which the press-fitting projection 81e of each of three pressing claws 81c out of six pressing claws 81c of the stator core 80 is press-fitted. The radial interior of the side wall 91b is formed into an arcuate shape in contact with the inscribed circle with the radius R4 (see FIG. 13).

As shown in FIG. 13, on the interior of the motor housing unit 90, two fitting recesses 92 are formed in such a way as to bulge toward the radial exterior of the motor housing unit 90. These fitting recesses 92 are arranged at equal intervals (180-degree intervals) around the through-hole 31c in the circumferential direction of the stator core 80. In the fitting recesses 92, the screw fixing portions 82 (see FIG. 10) formed on the stator core 80 are respectively fitted. Here, by fitting the screw fixing portions 82 of the stator core 80 into the respective fitting recesses 92, three pressing claws 81c are automatically press-fitted to the respective interiors of three side walls 91b. The remaining three pressing claws 81c are not press-fitted in the motor housing unit 90. The press-fitting load of the stator core 80 to the motor housing unit 90 is therefore kept small.

Additionally, each screw fixing portion 82 of the stator core 80 can be fitted in either of two fitting recesses 92. That is, this means that the stator core 80 rotated in reverse by 180 degrees around its axis can be housed in the motor housing unit 90. In this manner, the efficiency of attachment of the stator core 80 to the motor housing unit 90 is improved. When the stator core 80 rotated in reverse by 180 degrees relative to the motor housing unit 90 is fitted therein, the press-fitting projections 81e of the other set of three pressing claws 81c out of the six pressing claws 81c are respectively press-fitted to the interiors of the three side walls 91b, which is a case contrary to the above case.

The fitting recesses 92 formed on the motor housing unit 90 are respectively provided with the female screws FS, in which the male screws SC of FIG. 9 are respectively screwed. The female screws FS are, therefore, arranged at equal intervals (180-degree intervals) around the through-hole 31c in the circumferential direction of the stator core 80, as the male screws SC are. Thus, the male screws SC are inserted in the insertion holes 83 of the stator core 80 and are respectively screwed in the female screws FS. This helps fixing the stator core 80 firmly to the motor housing unit 90. Since the press-fitting projections 81e of the three pressing claws 81c are respectively press-fitted to the three side walls 91b, the rattling of the stator core 80 to the motor housing unit 90 is suppressed when the male screws SC are respectively screwed in the female screws FS. This allows the male screws SC to be tightened easily in a secured manner. The female screws FS form fixing holes of the present invention, which means that the male screws SC are respectively fixed to the female screws FS.

As shown in FIG. 15, the depth DP of the part of stator core 80 which is press-fitted in the motor housing unit 90 is about ⅙ of the axial dimension of the stator core 80. This also keeps the press-fitting load of the stator core 80 to the motor housing unit 90 small. The small depth of the part of stator core 80 which is press-fitted in the motor housing unit 90 significantly reduces scraped debris which are produced when the stator core 80 is press-fitted in the motor housing unit 90.

The third embodiment of the above configuration offers the same effect offered by the first embodiment. Additionally, the third embodiment reduces the press-fitting load of the stator core 80 to the motor housing unit 90, thus suppressing the production of scraped debris (foreign objects).

The third embodiment provides the fixing structure for fixing the stator core 80 to the motor housing unit 90 using the pressing claws 81c, as well as the auxiliary fixing structure in which the male screws SC are respectively screwed in the female screws FS. This solves a problem of insufficient strength under high temperature that results from a linear expansion coefficient difference caused by a difference in material between the stator core 80 and the motor housing unit 90, thus suppressing noises, etc., from the brushless wiper motor 70.

Furthermore, since the small depth DP of the part of the stator core 80 t is press-fitted in the motor housing unit 90, the production of scraped debris is suppressed as press-fitting work is simplified. Therefore, this allows saving manufacturing energy necessary for the press-fitting work. The smaller press-fitting load suppresses the distortion of the steel sheets 80a forming the stator core 80, thereby suppressing a variation or decline in magnetic properties. Therefore, it is possible to provide the highly reliable brushless wiper motor 70.

Furthermore, since the pressing claws 81c are capable of elastic deformation toward radial outside of the main body 80b forming the magnetic circuit, this prevents the decline in magnetic properties.

Furthermore, since the motor housing unit 90 is provided with three portions (overhanging portions 91) to which the press-fitting projections 81e are pressed and fitted, it is possible to shorten the time for cutting process necessary for dimensional precision. Therefore, this can save energy for manufacturing.

Furthermore, since the male screws SC are disposed inside the motor housing unit 90, this structure does not hamper the waterproof performance of the brushless wiper motor 70.

The present invention is not limited to the above embodiments and may obviously be modified into various forms of applications on the condition that the modification does not deviate from the substance of the invention. In the above embodiment, the sets of first and second pressing claws 43a and 43b are respectively arranged on the parts of the main body 34d on which the teeth 34e are formed along the periphery of the main body 34d, and the pressing claws 81c are respectively arranged on the parts of the main body 80b on which the teeth 80c are formed along the periphery of the main body 80b. Arrangement of the pressing claws is, however, not limited to this.

For example, the sets of first and second pressing claws 43a and 43b may be respectively arranged on the parts of the main body 34d on which the slots "S" are formed along the periphery of the main body 34d, and the pressing claws 81c may be respectively arranged on the parts of the main body 80b on which the slots "S" are formed along the periphery of the main body 80b. For six teeth 34e, four sets of the first and second pressing claws 43a and 43b may be provided, or five first pressing claws 43a and five second pressing claws 43b may be arranged alternately in the circumferential direction of the main body 34d. For six teeth 80c, four or five pressing claws 81c may be provided such that respective tip end portions of adjacent pressing claws 81c are directed in different directions. In this manner, the number of the first pressing claws 43a, of the second pressing claws 43b, and of the pressing claws 81c is determined arbitrarily. It is nevertheless preferable that the number of these pressing claws be determined to be the number that does not lead to a drop in the performance of the brushless wiper motor 20 and of the brushless wiper motor 70.

Furthermore, according to the third embodiment, the male screws SC are used as the fixing members, and the female screws FS are used as the fixing holes. The fixing members and the fixing holes of the present invention are, however, not limited to this. For example, press-fitting pins may be used as the fixing members, and pin fixing holes in which the press-fitting pins are pressed and fixed may be used as the fixing holes. In short, the fixing members and the fixing holes should form a fixing structure for fixing the stator core 80 to the motor housing unit 90, and do not always need to form a screw fixing structure of the third embodiment.

According to the third embodiment, the stator core 80 is fixed with the screws at its two parts at equal intervals (180-degree intervals) in the circumferential direction of the stator core 80. The screw fixing method of the present invention is, however, not limited to this. For example, the stator core 80 may be fixed with screws at its four parts at equal intervals (90-degree intervals) in the circumferential direction of the stator core 80 to meet a requirement for higher fixing strength.

The above embodiments describe the wiper apparatus 12 having the power transmitting mechanism 14. The wiper apparatus of the present invention is, however, not limited to this wiper apparatus 12, and may dispense with the power transmitting mechanism 14 as a mechanism which transmits the oscillatory movement of the brushless wiper motor 20 or brushless wiper motor 70 to the pivot shafts 13a and 13b. In such a case, to transmit power to the pivot shafts 13a and 13b, the wiper apparatus includes brushless wiper motors corresponding to the respective pivot shafts 13a and 13b.

According to the above embodiments, each of the brushless wiper motor 20 and the brushless wiper motor 70 is used as the power source for the wiper apparatus 12 which wipes the front windshield 11 of the vehicle 10. Application of the brushless wiper motor 20 and the brushless wiper motor 70 of the present invention is, however, not limited to this. Each of the brushless wiper motor 20 and the brushless wiper motor 70 can also be used as a power source for a vehicular rear wiper apparatus or a power source for a wiper apparatus of a railroad car, ship, construction machine, etc.

The brushless wiper motor is used as a power source for a wiper apparatus incorporated in a vehicle such as automotive vehicle, and used to swing the wiper arms, and wipe rainwater, etc., away from the windshield.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A brushless wiper motor which swings a wiper, comprising:
 a housing which rotatably supporting an output shaft;
 a motor housing unit attached to the housing;
 a stator housed in the motor housing unit;
 a rotor disposed inside the stator, the rotor rotating the output shaft; and
 a pressing claw formed on an outer periphery of the stator, the pressing claw being pressed against an inner periphery of the motor housing unit to fix the stator to the motor housing unit, a tip end portion of the pressing claw being provided with a press-fitting projection projecting in an outward direction of the stator, wherein
 a base end portion of the pressing claw is connected to the outer periphery of the stator,
 a tip end portion of the pressing claw serves as a free end and is directed in a circumferential direction of the stator,
 the stator is press-fitted in the housing with the press-fitting projection pressed against an inner face of the housing.

2. The brushless wiper motor according to claim 1, wherein
 a recess is formed on an outer periphery of the stator, the recess having a pair of walls directed in directions along the outer periphery of the stator, and
 the pressing claw is formed on at least one of the walls.

3. The brushless wiper motor according to claim 1, wherein
  each of a tooth wound with coils are formed on an inner periphery of the stator, and
  the pressing claw is formed so as to correspond to each of the tooth formed along the inner periphery of the stator,
  the press-fitting projection is disposed on a center line of each of the tooth.

4. The brushless wiper motor according to claim 1, wherein
  a plurality of pressing claws are provided,
  a tip end portion of one of two pressing claws adjacent to each other is directed in one direction along a periphery of the stator, and
  a tip end portion of the other of said two pressing claws adjacent to each other is directed in the other direction along the periphery of the stator.

5. The brushless wiper motor according to claim 1, wherein a plurality of pressing claws are arranged at equal intervals along a circumferential direction of the stator.

6. The brushless wiper motor according to claim 1, wherein
  a recess is formed on the outer periphery of the stator, and
  a projection is formed on an inner periphery of the motor housing unit, the recess and the projection being engaged with each other.

7. The brushless wiper motor according to claim 1, wherein
  the housing is made of aluminum and
  the stator is composed of stacked steel sheets which are higher in hardness than the housing.

8. The brushless wiper motor according to claim 1, wherein the stator has an insertion hole extending in an axial direction of the stator, the insertion hole allowing a fixing member to be inserted therein, and the motor housing unit has a fixing hole in which the fixing member is fixed.

9. The brushless wiper motor according to claim 8, wherein the fixing member is a male screw, and the fixing hole is a female screw hole.

10. The brushless wiper motor according to claim 8, wherein at least two insertion holes and at least two fixing holes are arranged at equal intervals in a peripheral direction of the stator.

11. The brushless wiper motor according to claim 1, wherein
  straight line parts extend at respective sides of the press-fitting projection, and
  a gap is formed between each straight line part of the pressing claw and an inner wall of the motor housing unit.

* * * * *